US011197248B2

(12) United States Patent
Guibene et al.

(10) Patent No.: US 11,197,248 B2
(45) Date of Patent: Dec. 7, 2021

(54) METHODS AND APPARATUS TO COMMUNICATE WITH AN END POINT DEVICE

(71) Applicant: Charter Communications Operating, LLC, St. Louis, MO (US)

(72) Inventors: Wael Guibene, Denver, CO (US); Umamaheswar Achari Kakinada, Centennial, CO (US); Hossam Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 122 days.

(21) Appl. No.: 16/752,480

(22) Filed: Jan. 24, 2020

(65) Prior Publication Data

US 2021/0235393 A1  Jul. 29, 2021

(51) Int. Cl.
*H04W 52/24* (2009.01)
*H04W 24/10* (2009.01)
*H04W 88/16* (2009.01)
*H04W 84/18* (2009.01)

(52) U.S. Cl.
CPC ......... *H04W 52/247* (2013.01); *H04W 24/10* (2013.01); *H04W 88/16* (2013.01); *H04W 84/18* (2013.01)

(58) Field of Classification Search
CPC . H04W 52/146; H04W 52/247; H04W 52/08; H04W 52/34; H04W 52/248; H04W 24/08; H04W 24/06; H04W 24/04; H04W 24/02; H04W 24/10; H04W 84/18; H04W 88/16; H04W 4/70
See application file for complete search history.

(56) References Cited

U.S. PATENT DOCUMENTS

| 7,840,221 B1 | 11/2010 | Kim et al. |
| 2018/0183874 A1* | 6/2018 | Cook .................. H04L 41/0816 |
| 2018/0295583 A1* | 10/2018 | Cornwall .......... H04W 52/0258 |

FOREIGN PATENT DOCUMENTS

WO    2019015040 A1    1/2019

OTHER PUBLICATIONS

Ayoub Wael et al: 11 Overview and Measurement of Mobility in DASH7 11,2018 25th International Conference on Telecommunications (ICT), IEEE, Jun. 26, 2018 (Jun. 26, 2018), pp. 532-536, XP033400012, DOI: 10.1109/ICT.2018.8464846.
Notification of Transmittal of the International Search Report and the Written Opinion of the International Searching Authority, International Search Report and Written Opinion of the International Searching Authority from PCT/US2021 /014464, dated Apr. 30, 2021, 35 pages.

* cited by examiner

*Primary Examiner* — Ricardo H Castaneyra
(74) *Attorney, Agent, or Firm* — Straub & Straub; Michael P. Straub; Stephen T. Straub

(57) ABSTRACT

An end point (EP) device may communicate with multiple gateways via wireless signals, e.g. wireless broadcast signals. An EP device is controlled, under the direction of a control server, e.g., an application server, to communicate via a single gateway. The control server associates the EP device with a single target gateway and/or uses EP transmission power control training iterations to reduce the EP transmission power level until the EP device is only able to successfully communicate its wireless signals to a single gateway.

20 Claims, 22 Drawing Sheets

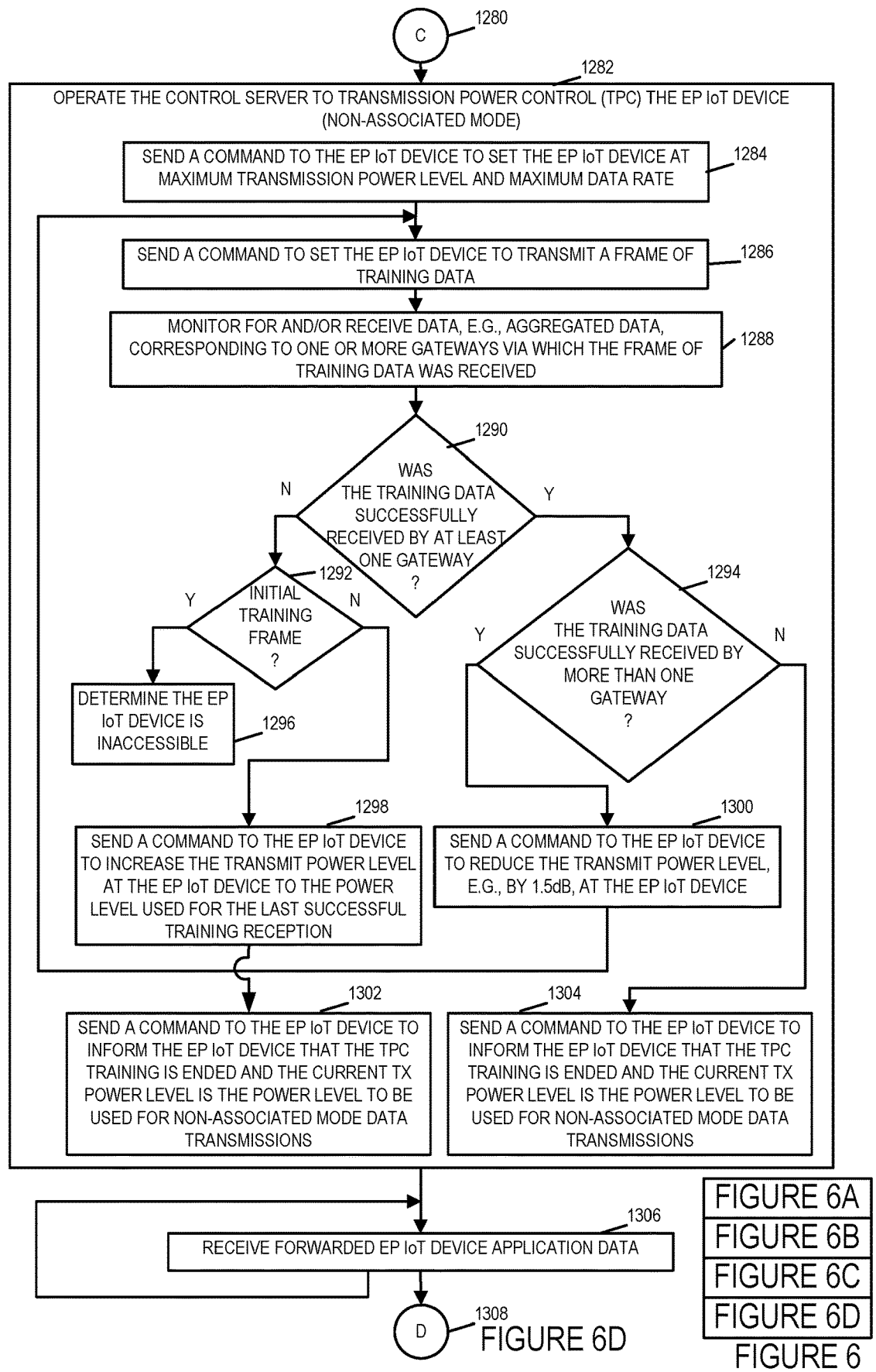

| FIGURE 11A | FIGURE 11B | FIGURE 11C | FIGURE 11D |

METHODS AND APPARATUS TO COMMUNICATE WITH AN END POINT DEVICE

FIELD

The present invention relates to wireless communications systems, and more particularly, to methods and apparatus for reducing interference and/or increasing throughput in a wireless communications system, e.g., a wireless communications system using end point device wireless broadcast signaling and/or a wireless communications system supporting alternative wireless communications paths for an end point device.

BACKGROUND

Internet of Things (IoT) and Low Power Wide Area (LPWA) devices suffer from lack of device to gateway (GW)/edge node association and are rather associated with a network server (NS). This is a blocker to enable technologies like 6lowpan on top of LPWA. A lack of device and gateway (GW) association also limits low cost localization capabilities of the device.

In various existing architectures IoT and LPWA devices are not paired to a gateway. The device can, and sometimes does, communicate with multiple gateways at the same time, e.g., via a transmitted broadcast signal which is intended to be received, recovered and forwarded by any GW which can recover the broadcast signal. Thus the same device's application data is frequently sent over multiple wireless links and multiple paths in the network, e.g., to an application server, which is redundant, inefficient and often unnecessary. This redundant communications wastes both air link and backhaul network resources and the transmissions can interfere with transmissions from other device when transmitted at a power level higher than is necessary.

Based on the above, there is a need for new methods and apparatus for supporting device communications, e.g. with an application server, in a more efficient manner and particularly the transmission power used by individual end point devices.

SUMMARY

Various features relate to methods and apparatus for power controlling end point devices which communicate with an application server using wireless signals transmitted to one or more gateways that are connected to a control server. In many embodiments the control server is an application server which supports one or more applications, e.g., meter reading, billing or other applications, but also acts to control transmission power levels of end point devices that transmit data to the server for use by the applications the server supports. Accordingly, it should be appreciated that in many cases a server operates as both an application and control server. In embodiments where the application and control server are a single entity it may be referred to as either an application or control server since it serves both functions. While a control server supports power control operations additional application functionality is optional and need not be supported in all embodiments.

The methods and apparatus of the invention are well suited for use in a wide variety of systems including systems which use a low power wide area network to communicate information. The low power wide area networks may support long range signaling.

In various embodiments end point (EP) devices, e.g., IoT devices, which may be, for example, voltage meters, parking meters, sensors or any of a wide range of devices are power controlled through the use of training data transmissions and power control signaling from a control server, e.g., an application server which is responsible in some embodiments for collecting and/or using data from IoT devices but also, in accordance with the invention power controlling at least some IoT devices.

In various embodiments, IoT devices transmit wireless signals, e.g., broadcast signals. Gateways in the system receive the wireless signals, recover the data in the signals and transmit it to the application server. In some embodiments, the wireless gateways are connected via a wired or wireless network to the application server. The application in some embodiments also acts as a control server which may and sometimes does control the transmission power used by one or more EP devices. Because wireless signals are broadcast by EP devices, the signals may be received by multiple gateways if there is more than one gateway in the transmission coverage area of the transmitting EP device.

The coverage area of the signals transmitted by the EP devices depends on the transmission power at which they are transmitted. As gateways receive data, e.g., messages, from EP devices they communicate them through the network used to couple the gateway to the application server. Since the same data may be received by multiple gateways, the same data, received by different gateways, can and sometimes is transmitted in the communications network towards the application server. In some cases a network server in the communications network aggregates data, e.g., messages from different gateways, and communicates the data, e.g., message, to the application and/or control server with information identifying the gateways that received the data being forwarded. In such a case, due to aggregation, the application and/or control server may receive a single copy of data that was received by multiple gateways but with information as to which gateways received the wireless signal communicating the data from the EP device to which the data corresponds.

In accordance with various features in some embodiments, the server, acting as a control server, signals an EP device to operate in a training mode of operation. Power control training mode operation the EP device being trained transmits, e.g., wirelessly broadcasts a set of training data. The initial training data is transmitted at maximum power and in at least some embodiments using a maximum transmission data rate supported by the EP device being subjected to training. Gateway devices receiving the training data transmission recover the data and forward it to the control server along with information identifying the gateway that received the transmission that is being forwarded. The initial transmission of training data, because it is transmitted at maximum transmit power, is likely to be received by multiple gateways. Thus multiple gateways may, and often will, receive and forward the initial training data message to the control server.

Optionally a network device in the communications path between the receiving gateways and the control, e.g., application, server may and sometimes does aggregate the messages, e.g., forward training data and gateway identifiers, so that a single message communicates the training data received by multiple gateways and the gateway identifiers. In other embodiments the control server receives separate messages from the different gateways that successfully receive the transmitted training data from the end point device.

In various embodiments, where a EP device is to be associated with a particular gateway, the control device operates with respect to the EP device in what is referred to as an associated mode of operation where the EP device is to be associated with a particular gateway that is to be used in a communications path between the EP device and application server which, as discussed above may also be the control server. In associated mode, an EP device can be associated with a gateway specified by the EP device, e.g., in an associate request or with a gateway selected by the control server. In associated mode as part of transmission power control training EP transmission power is reduce in a sequence of operations to a level that allows the EP device to communicate using the gateway with which is to be associated but without requiring use of full transmission power in cases where the gateway with which an EP device is associated can be reached, and still support a maximum data transmission rate, using less than full transmission power.

In unassociated mode the EP device may be and sometimes is controlled to use a single gateway for communication to the application server where the gateway may be and sometimes is a gateway which can support a maximum transmission power level at a lower EP transmission power level than other gateways in the system. In many such embodiments the gateway which will be used will be the gateway with the best wireless communications path to the EP device.

In both the unassociated mode and the associated mode, the gateway which is to be used for communications with the application server may be and sometimes is referred to as the target gateway. Power control training takes into consideration the target gateway when reducing transmission power to the level that will be used for actual data transmissions, e.g., transmission of meter readings, sensor readings and/or parking meter toll information relating to a parked car.

An exemplary communications method, in accordance with some embodiments, comprises: receiving at a control server, training data that was wirelessly transmitted by a first end point device and received by one or more gateways coupled to said control server; determining whether the training data was successfully received by at least one gateway in addition to a target gateway; when it is determined that the training data was successfully received by at least one gateway in addition to the target gateway, sending a command to the first end point device to reduce the transmit power level; and when it is determined that the training data was not successfully received by at least one gateway in addition to the target gateway, sending a command to the first end point device to indicate that training has ended.

Methods and apparatus in accordance with the present invention are well suited for long range low power wireless IoT communications technologies such as, e.g. Sigfox and LoRaWAN. In addition methods and apparatus in accordance with the present invention are also suitable for use in other access technologies such as, e.g. Narrow Band—Internet of Things (NB—IoT), LTE-M and future C-LP-WAN.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURES

FIG. 3 comprising the combination of FIG. 3A, FIG. 3B, FIG. 3C, FIG. 3D and FIG. 3E.

FIG. 4 comprises the combination of FIG. 4A and FIG. 4B.

FIG. 6D is a fourth part of a flowchart of an exemplary method of operating a control server, e.g. an application server, in accordance with an exemplary embodiment.

FIG. 6, comprises the combination of FIG. 6A, FIG. 6B, FIG. 6C and FIG. 6D.

DETAILED DESCRIPTION

Figure 1:
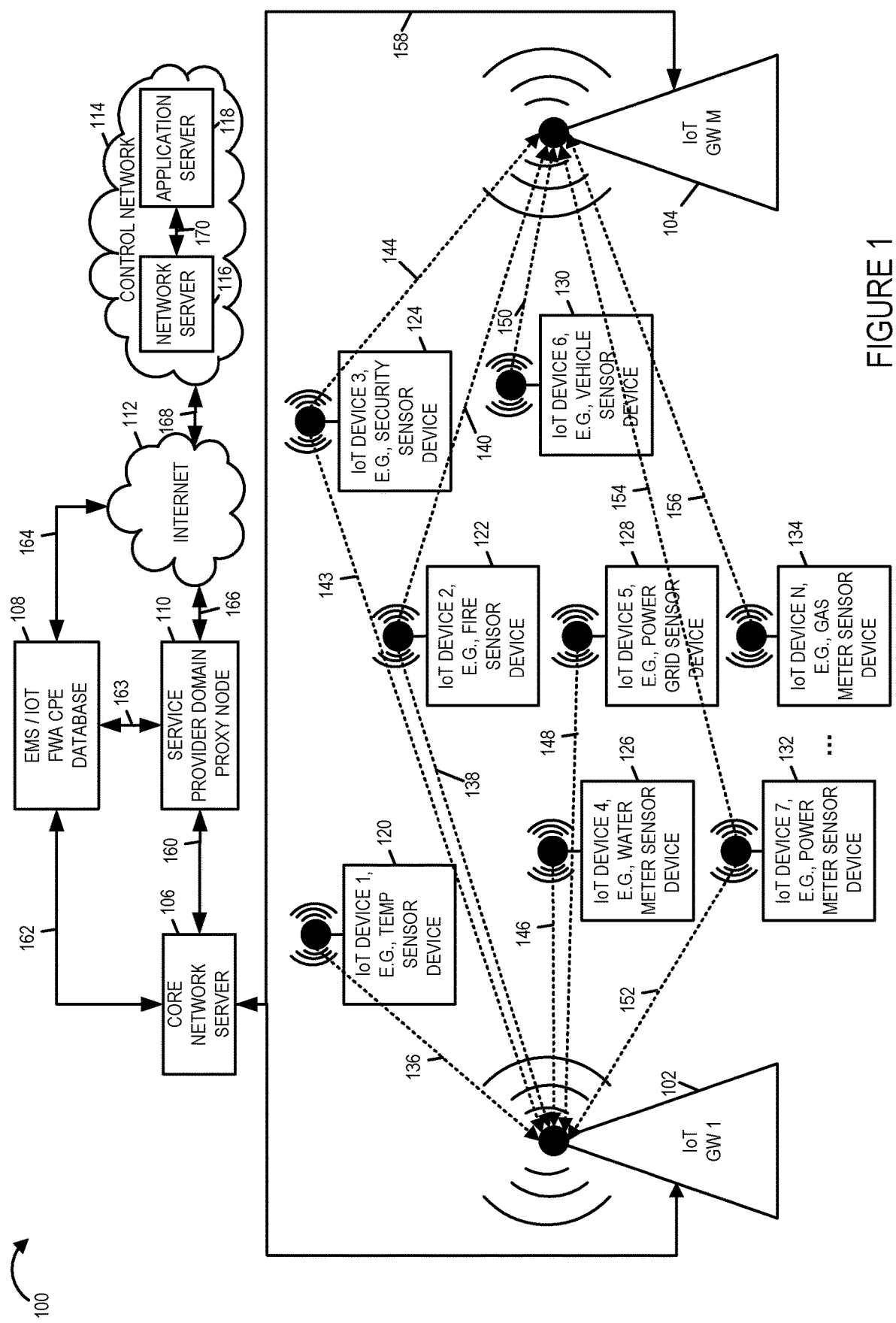
FIG. 1 is a drawing of an exemplary communications system including a plurality of Internet-of-Things (IoT) devices which transmit IoT wireless broadcast uplink signals which may be received by multiple IoT gateways.

FIG. 1 is a drawing of an exemplary communications system 100 including Internet-of-Things (IoT) gateways (IoT GW 1 102, IoT GW M 104), a core network server 106, an Element management system/Internet of Things Fixed Wireless Access Customer Premises Equipment (EMS/IoT FWA CPE) database 108, a service provider domain proxy node 110, Internet 112, control network 114, and a plurality of IoT devices (IoT device 1 120, e.g., a temperature sensor device, IoT device 2 122, e.g., a fire sensor device, IoT device 3 124, e.g., a security sensor device, IoT device 4 126, e.g., a water meter sensor device, IoT device 5 128, e.g., a power grid sensor device, IoT device 6 130, e.g., a vehicle sensor device, IoT device 7, e.g., a power meter sensor device, . . . , IoT device N 134, e.g., a gas meter sensor device). IoT GW 1 102 and IoT GW M 104 are coupled to core network server 106, via backhaul network link(s) 158. Core network server 106 is coupled to service provider domain proxy node 110 via link 160. Core network server 106 is coupled to EMS/IoT FWA CPE database 108 via link 162. The service provider domain proxy node 110 is coupled to EMS/IoT FWA CPE database 108 via link 163. The service provider domain proxy node 110 and the EMS/IoT FWA CPE database are coupled to Internet 112, via communications links 166, 164, respectively. The control network 114 is coupled to Internet 112 via communications link 168. The control network 114 includes a network server 116 and application server 118 coupled together via communications link 170.

Each of the IoT devices (120, 122, 124, 126, 126, 130, 132, . . . 134) transmits broadcast uplink IoT wireless signals, e.g., at maximum transmit power level. Depending upon channel conditions, a broadcast IoT signal may be received by one or more IoT GW devices. IoT device broadcast uplink signals from an IoT device, may be, and sometimes are, detected by both IoT GWs (102, 104) and information communicated in the received signals is forwarded by each of the GWs (102, 104), e.g., toward the application server 118. This results in redundant data being communicated toward the application server.

In drawing 100 of FIG. 1, IoT device 1 120 has a wireless IoT communications link with IoT GW 1 102 as indicated by dashed arrow 136. In drawing 100 of FIG. 1, IoT device 2 122 has a wireless IoT communications link with IoT GW 1 102 as indicated by dashed arrow 138 and a wireless IoT communications link with IoT GW M 104 as indicated by dashed arrow 140. In drawing 100 of FIG. 1, IoT device 3 124 has a wireless IoT communications link with IoT GW 1 102 as indicated by dashed arrow 143 and a wireless IoT communications link with IoT GW M 104 as indicated by dashed arrow 144. In drawing 100 of FIG. 1, IoT device 4 126 has a wireless IoT communications link with IoT GW 1 102 as indicated by dashed arrow 146. In drawing 100 of FIG. 1, IoT device 5 128 has a wireless IoT communications link with IoT GW 1 102 as indicated by dashed arrow 148. In drawing 100 of FIG. 1, IoT device 6 130 has a wireless IoT communications link with IoT GW M 104 as indicated by dashed arrow 150. In drawing 100 of FIG. 1, IoT device 7 132 has a wireless IoT communications link with IoT GW 1 102 as indicated by dashed arrow 152 and a wireless IoT communications link with IoT GW M 104 as indicated by dashed arrow 154. In drawing 100 of FIG. 1, IoT device N 134 has a wireless IoT communications link with IoT GW M 104 as indicated by dashed arrow 156.

Figure 2:
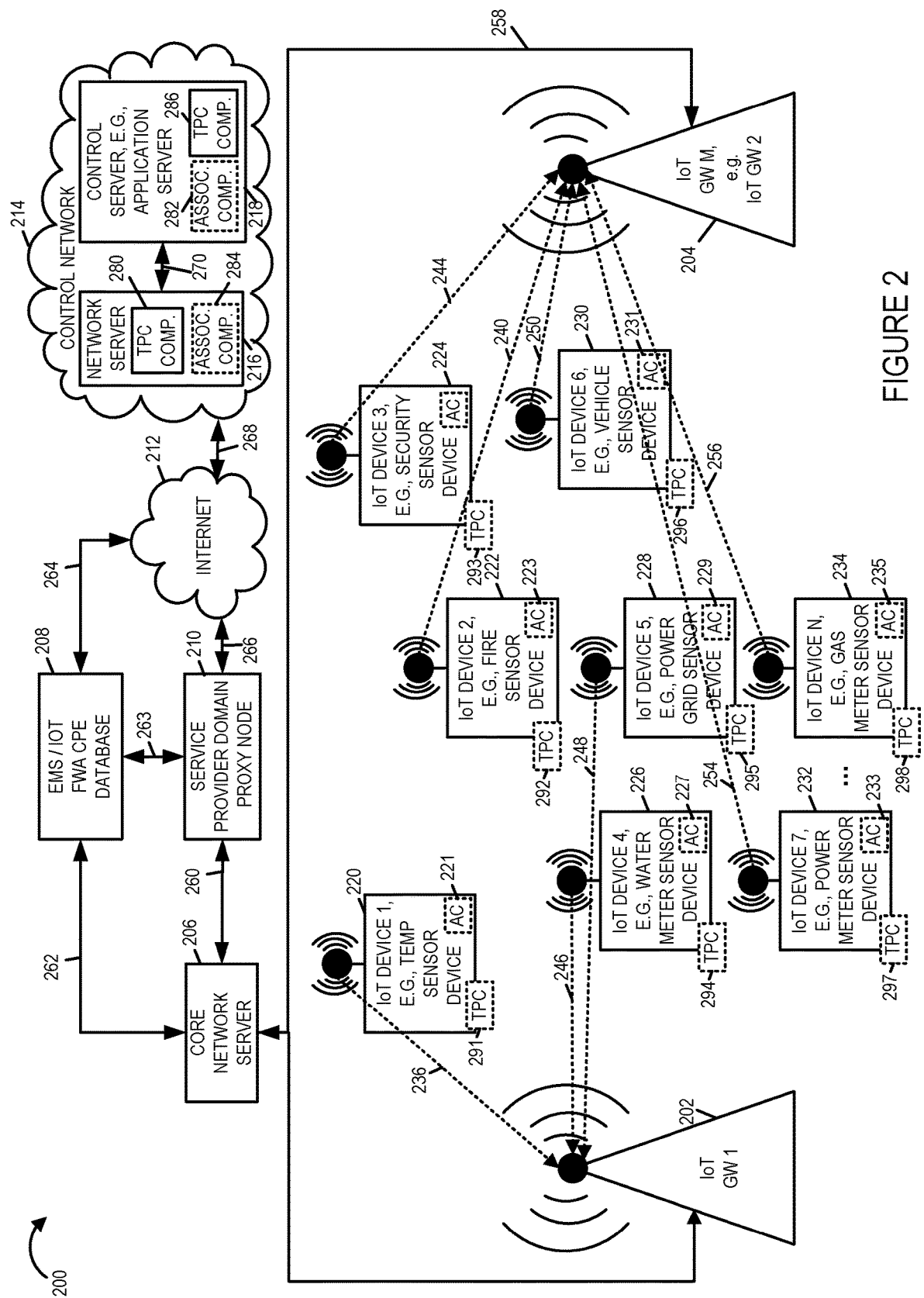
FIG. 2 is a drawing of an exemplary communications system including a plurality of end point (EP) Internet-of-Things (IoT) devices which transmit IoT wireless broadcast uplink signals, said exemplary system supporting transmission power control (TPC) of EP IoT devices and/or association of an EP IoT device with a selected gateway, to reduce interference and/or increase throughput, in accordance with an exemplary embodiment.

FIG. 2 is a drawing of an exemplary communications system 200 supporting IoT communications, e.g., long range IoT communications, implemented in accordance with an exemplary embodiment. Exemplary communications system 200 supports transmission power control (TPC), e.g., on an individual device basis, for end point (EP) IoT devices, e.g., under the direction of a control server, e.g., application server 219 of control network 263. Exemplary communications system 200 supports association, e.g., pairing, of an EP IoT device with a single selected IoT GW, and establishment of an end-to-end (E2E) communications path between the EP IoT device and a control server, e.g., application server 218, said E2E communications path including an IoT wireless link between the EP IoT device and the selected IoT GW. In various embodiments, a transmission power level of an EP IoT device is determined, e.g., via TPC training iterations, and set to the determined level so that an EP IoT device's broadcast application data transmissions, e.g., sensor reports, are successfully communicated to one IoT gateway.

Exemplary communications system 200 includes Internet-of-Things (IoT) gateways (IoT GW 1 202, IoT GW M 204), a core network server 206, an Element management system/Internet of Things Fixed Wireless Access Customer Premises Equipment (EMS/IoT FWA CPE) database 208, a service provider domain proxy node 210, Internet 212, control network 214, and a plurality of end point (EP) IoT devices (IoT device 1 220, e.g., a temperature sensor device, IoT device 2 222, e.g., a fire sensor device, IoT device 3 224, e.g., a security sensor device, IoT device 4 226, e.g., a water meter sensor device, IoT device 5 228, e.g., a power grid sensor device, IoT device 6 230, e.g., a vehicle sensor device, IoT device 7 232, e.g., a power meter sensor device, . . . , IoT device N 234, e.g., a gas meter sensor device). IoT GW 1 202 and IoT GW M 204 are coupled to core network server 206, via backhaul network link(s) 258. Core network server 206 is coupled to service provider domain proxy node 210 via link 260. Core network server 206 is coupled to EMS/IoT FWA CPE database 208 via link 262. The service provider domain proxy node 210 is coupled to EMS/IoT FWA CPE database 208 via link 263. The service provider domain proxy node 210 and the EMS/IoT FWA CPE database 208 are coupled to Internet 212, via communications links 266, 264, respectively. The control network 214 is coupled to Internet 212 via communications link 268. The control network 214 includes a network server 216 and application server 218 coupled together via communications link 270. Network server 216 includes a transmit power control component 280 and an association component 284. Application server 216 includes a transmit power control component 282 and an association component 286.

Each of the EP IoT devices (220, 222, 224, 226, 226, 228, 230, 232, . . . 234) transmits broadcast uplink IoT wireless signals. In accordance with a feature of various embodiments, the EP IoT devices shown in FIG. 2 have been subjected to transmit power control (TPC) training operations and/or association operations under the direction of a control server, e.g., application server 218. In the example of FIG. 2, the TPC has resulted in each of the EP IoT devices (220, 222, 224, 226, 226, 228, 230, 232, . . . 234) having a wireless IoT communications link with a single IoT gateway device. Due to the TPC operations, at least some of the EP IoT devices (220, 222, 224, 226, 226, 228, 230, 232, . . . 234) have been controlled to operate at a reduced transmission power level from the maximum allowable transmission power level, thus eliminating some redundant connections with IoT GWs in the system, reducing interference in the wireless spectrum being used for communications and reducing backhaul signaling between the IoT GWs and the application server.

EP IoT device 1 120 has a wireless IoT communications link with IoT GW 1 102 as indicated by dashed arrow 236. EP IoT device 2 222 has a wireless IoT communications link with IoT GW M 104 as indicated by dashed arrow 240. EP IoT device 3 224 has with a wireless IoT communications link with IoT GW M 104 as indicated by dashed arrow 244. EP IoT device 4 226 has a wireless IoT communications link with IoT GW 1 102 as indicated by dashed arrow 246. EP IoT device 5 228 has a wireless IoT communications link with IoT GW 1 202 as indicated by dashed arrow 248. EP IoT device 6 230 has a wireless IoT communications link with IoT GW M 204 as indicated by dashed arrow 250. EP IoT device 7 232 has a wireless IoT communications link with IoT GW M 204 as indicated by dashed arrow 254. EP IoT device N 234 has a wireless IoT communications link with IoT GW M 204 as indicated by dashed arrow 256.

FIG. 3, comprising the combination of FIG. 3A, FIG. 3B, FIG. 3D, and FIG. 3E, is an exemplary signaling drawing 300, comprising Part A 301, Part B 303, Part C 305, Part D 307 and Part E 309, in accordance with an exemplary embodiment. Exemplary signaling drawing 300 includes an exemplary end point IoT device 302, GW 1 202, GW 2 204, Network Server (NS) 216 and Application Server (AS) 218. Exemplary EP IoT device 302 is, e.g., any of the IoT devices (220, 222, 224, 226, 228, 230, 232, . . . , 234) of system 200 of FIG. 2. Exemplary signaling drawing 300 illustrates: exemplary end point (EP) IoT device association with a single selected gateway device in response to an association request, exemplary EP IoT device transmit power control (TPC) training operations under the direction of a control server, a determination of a transmit power level to be used by the EP IoT for application data transmission while in associated mode, said determined power being lower than the maximum allowable TX power, and the transmission of EP IoT application data at the determined TX power level, with the EP IoT application data being received by a single IoT GW, which is the selected GW associated with (paired to) the EP IoT device.

In step 304, EP IoT device 302 generates and transmits wireless IoT broadcast signals 306 communicating a join request. In step 308 GW 1 202 receives signal 306. In step 310 GW 1 202 generates and sends message 312 communicating the joint request to network server (NS) 216. In step 312 the network server 216 receives message 312 and recovers the join request from GW 1 202. In step 314 GW 2 204 receives signal 306. In step 316 GW 2 204 generates and sends message 318 communicating the joint request to network server 216. In step 320 the network server 216 receives message 318 and recovers the join request from GW 2 204. In step 322 the network server generates and sends message 324 communicating the join request to application server (AS) 218. In step 326, in response to the received join request, the AS 218 generates and send message 330 communicating a join accept to NS 216. In step 332, NS 216 receives message 330, and in step 334, the NS 216 generates and sends message 336 communicating the join accept to GW 2 204. In step 340 GW 2 204 generates and sends wireless IoT signals 342 communicating the join accept to EP IoT device 302. In step 344 EP IoT device 302 receives signals 342 and recovers the join accept.

In step 346 EP IoT device 302 generates and sends wireless IoT broadcast signals 348 communicating an association request. In step 350 GW 1 202 receives signal 348. In step 352 GW 1 202 generates and sends message 354 communicating the association request and GW 1 metadata (MD) 358 including RF information, to network server (NS) 216. In step 358 the network server 216 receives message 354 and recovers the communicated association request and GW 1 metadata from GW 1 202. In step 360 GW 2 204 receives signal 348. In step 362 GW 2 204 generates and sends message 363 communicating the association request and GW 2 metadata 364 including RF information, to network server (NS) 216. In step 366 the network server 216 receives message 363 and recovers the communicated association request and GW 2 metadata from GW 2 204.

In step 368 network server 216 aggregates the data received from both GWs, corresponding to EP IoT device 302, generates message 370 communicating the association request information, GW 1 metadata 356 and GW 2 metadata 364, and sends message 370 to the application server 218. In step 374 the application server 218 receives message 370 and recovers the communicated information. In step 374, the application server decides to use GW 2 204 for an end-to-end (E2E) communications route, e.g. based on RF characteristics from GW 1 metadata 356 and GW 2 metadata 364, e.g., a stronger signal was received at GW 2 204. Thus application server 218 has associated EP IoT device 302 with GW 2 204.

In step 374, application server 218 generates and sends message 377 to network server 216. Message 377 includes an acknowledgment 382 corresponding to the association request, an instruction 380 to the network server 216 to request EP IoT device 302 to operate in class C always on and application server metadata 378. In some embodiments, the AS metadata 378 includes an identifier corresponding the selected GW, which is GW 2 204 and/or an identifier corresponding to the E2E communications path which is being established and which includes the selected GW, which is GW 2. In step 383 the network server 216 receives message 377 and recovers the communicated information. In step 384 the network server 216 generates and sends association acknowledgment message 384 to GW2 204. The association acknowledgement message 384 includes the acknowledgment 382 for the association request, a request 380' to the EP IoT device 302 to set the device in class C always on, and the application server metadata 378. In step 386 GW 2 204 receives the association acknowledgement message 384 and recovers the communicated information. In step 388 GW 2 204 generates and sends wireless IoT signals 390 communicating the acknowledgment 382 for the association request, a request 380' to the EP 302 for class C always on, and application server metadata 378. In step 392 EP IoT device 302 receives signals 390 and recovers the communicated information.

In step 394, EP IoT device 302 switches to class C operation. In step 396 EP IoT device 302 generates and transmits broadcast IoT signals 398 communicating a route request. The route request conveys a command to acknowledge the received request for class C, as indicated by block 400. In step 404 GW 1 202 receives signals 398 and recovers the communicated information. In step 404 GW 1 202 generates and sends route request message 406 to network server 216, and in step 408 the network server receives route request message 406. In step 410 GW 2 204 receives signals 398 and recovers the communicated information. In step 412 GW 2 204 generates and sends route request message 414 to network server 216, and in step 414 the network server 216 receives route request message 412. In step 416 the network server processes information from received messages 408 and 414, generates route request message 418, and sends route request message 418 to application server 218. Router request message 418 communicates an ACK for the class C request. In step 420, the application server 218 receives the router request message 418, and in response, in step 422 generates and sends a route acknowledgement message 424 to the network server. In some embodiments, the route acknowledgment message 424 includes an instruction for the network server 216 to command the EP IoT device 302 to start transmit power control (TPC) training. In step 426 the network server 216 receives the route acknowledgment message 424, and in step 428, the network server generate and sends route acknowledgment message 436 to GW 2 204. In some embodiments, the route acknowledgment message 430 includes a command to start TPC training. In step 431 GW 2 204 receives route acknowledgment message 430, and in step 432 GW 2 204 generates and sends IoT signals 434 including a route acknowledgment message, e.g., including an ack to the route request of signals 398 and including a command to start TPC training.

In step 438, EP IoT device 302 starts transmit power control (TPC) training operations. In step 440, the EP IoT device 302 generates and transmits IoT wireless signals 442 including training route data frame 1. The IoT wireless signals 442 including training route data frame 1 are transmitted, e.g., broadcast, at the highest data rate and highest transmit power level, as indicated by box 444. In step 446, GW 1 202 successfully receives the IoT signals 442 and recovers the communicated training route data frame 1. In step 448 GW 1 202 generates and sends message 450 including training route data frame 1 and GW 1 metadata 452, e.g., including GW 1 ID info, received RF info, e.g., received signal strength info, received SNR info, etc., to network server 216. In step 454 network server 216 receives message 450 and recovers the communicated information including the training route 1 data frame and the GW 1 metadata 452. In step 458, GW 2 204 successfully receives the IoT signals 442 and recovers the communicated training route data frame 1. In step 456 GW 2 204 generates and sends message 460 including training route data frame 1 and GW 2 metadata 461, e.g., including GW 2 ID info, received RF info, e.g., received signal strength info, received SNR info, etc., to network server 216. In step 464 network server 216 receives message 460 and recovers the communicated information including the training route 1 data frame and the GW 2 metadata 461. In step 464 the network server 216 aggregates information from receives messages 450 and 460, generates aggregated training route data frame 1 message 466 including training route data frame 1, GW 1 metadata 452 and GW 2 metadata 461 and sends message 466 to application server 218. In step 468, the AS 218 receives message 466 and recovers the communicated information. In step 470 the AS 218 determines, based on the received information of message 466 that both GW 1 202 and GW 2 204 have successfully received the training route data frame 1, decides to reduce the transmission power level of EP IoT device 302, generates message 472 and sends message 472 to NS 216. Message 472 includes an acknowledgment 474, acknowledging reception of the training route data frame 1, and an instruction 476 to the NS 216 to command the EP 302 to drop transmit (TX) power by one level, e.g. 1.5 dBm. In step 448, NS 216 receives message 472 and recovers the communicated information. In step 480 NS 216 generates and sends message 481 to GW 2 204. Message 481 includes an acknowledgment 482, acknowledging reception of the training route data frame 1, and a command 484 to the EP 302 to drop transmit (TX) power by one level, e.g. 1.5 dBm. In step 485 GW 2 204 receives message 481 and recovers the communicated information. In step 486 GW 2 204 generates and transmits IoT wireless signals 488 to EP IoT device 302 communicating ACK 482 and the command 484 to drop the TX power by one level. In step 490, EP IoT device 302 receives signals 488, recovers the communicated information and drops its TX power by one level.

In step 492, the EP IoT device 302 generates and transmits IoT wireless signals 494 including training route data frame 2. The IoT wireless signals 442 including training route data frame 2 are transmitted, e.g., broadcast, at the highest data rate and first reduced transmit power level, as indicated by box 496. In step 498, GW 1 202 successfully receives the IoT signals 494 and recovers the communicated training route data frame 2. In step 500 GW 1 202 generates and sends message 502 including training route data frame 2 and GW 1 metadata 504, e.g., including GW 1 ID info, received RF info, e.g., received signal strength info, received SNR info, etc., to network server 216. In step 506 network server 216 receives message 512 and recovers the communicated information including the training route 2 data frame and the GW 1 metadata 504. In step 508, GW 2 204 successfully receives the IoT signals 494 and recovers the communicated training route data frame 2. In step 510 GW 2 204 generates and sends message 512 including training route data frame 2 and GW 2 metadata 514, e.g., including GW 2 ID info, received RF info, e.g., received signal strength info, received SNR info, etc., to network server 216. In step 516 network server 216 receives message 512 and recovers the communicated information including the training route 2 data frame and the GW 2 metadata 514. In step 518 the network server 216 aggregates information from receives messages 502 and 512, generates aggregated training route data frame 2 message 520 including training route data frame 2, GW 1 metadata 504 and GW 2 metadata 514 and sends message 520 to application server 218. In step 522, the AS 218 receives message 520 and recovers the communicated information. In step 524 the AS 218 determines, based on the received information of message 520 that both GW 1 202 and GW 2 204 have successfully received the training route data frame 2, decides to reduce the transmission power level of EP IoT device 302, generates message 526 and sends message 526 to NS 216. Message 526 includes an acknowledgment 528, acknowledging reception of the training route data frame 2, and an instruction 530 to the NS 216 to command the EP 302 to drop transmit (TX) power by one level, e.g. 1.5 dBm. In step 532, NS 216 receives message 526 and recovers the communicated information. In step 534 NS 216 generates and sends message 535 to GW 2 204. Message 535 includes an acknowledgment 536, acknowledging reception of the training route data frame 2, and a command 538 to the EP 302 to drop transmit (TX) power by one level, e.g. 1.5 dBm. In step 540 GW 2 204 receives message 535 and recovers the communicated information. In step 542 GW 2 204 generates and transmits IoT wireless signals 544 to EP IoT device 302 communicating ACK 536 and the command 538 to drop the TX power by one level. In step 546, EP IoT device 302 receives signals 544, recovers the communicated information and drops its TX power by one level.

Additional iterations of a frame of training route data be sent and the EP IoT device 302 being subsequently commanded to reduce power, e.g., in response to the AS 218 determining that both GW 1 202 and GW 2 204 successfully received the frame of training route data may be, and sometimes are performed.

In step 448, the EP IoT device 302 generates and transmits IoT wireless signals 550 including training route data frame N. The IoT wireless signals 550 including training route data frame N are transmitted, e.g., broadcast, at the highest data rate and N-1 th. reduced transmit power level, as indicated by box 552. GW 1 202 does not successfully receives the IoT signals 554 as indicated by X 554. In step 556, GW 2 204 successfully receives the IoT signals 550 and recovers the communicated training route data frame N. In step 558 GW 2 204 generates and sends message 560 including training route data frame N and GW 2 metadata 562, e.g., including GW 2 ID info, received RF info, e.g., received signal strength info, received SNR info, etc., to network server 216. In step 564 network server 216 receives message 560 and recovers the communicated information including the training route data frame N and the GW 2 metadata 562. In step 558 the network server generates training route data frame N message 568 including training route data frame N, and GW 2 metadata 562 and sends message 568 to application server 218. In step 570, the AS 218 receives message 568 and recovers the communicated information. In step 572 the AS 218 determines, based on the received information of message 568 that power reductions have eliminated EP 302 communications via GW 1 202, that EP 302 communications via GW 2 204 to the NS 216/AS 218 are still operating and are satisfactory, and that TPC training for EP IoT device 302 is complete. In step 574, AS 218 generates and sends ACK message 574 to NS 216, said message conveying that training route data frame N was successfully received, that TPC training is complete, that TX power should remain at the current setting level, and that it is ok to proceed with sending sensor measurement reports using the current TX power level. In step 576 NS 216 receives ACK message 575. In response, in step 578, NS 216 generates and sends ACK message 580, e.g., a forwarded version of ACK 575 communicating information of ACK message 575, to GW 2 204. In step 582, GW 2 204 receives ACK message 580, and recovers the information communicated in message 580. In step 584 GW 2 204 generates and transmits IoT wireless signals 486 communicating the information of ACK message 580, to EP IoT device 302. In step 588, EP IoT device 302 receives signals 586 and recovers the communicated information.

In step 590 EP IoT device 302 determines that TPC training is complete and that the current TX power level should be used. In step 590 EP IoT device 302 is operated, e.g., to perform sensor measurements and generate a sensor measurement report including sensor application data set 1. In step 594, EP IoT device 302 generates wireless IoT signals 598 communicating device, e.g. sensor, application data set 1. Signals 598 are transmitted at the highest data rate and N-lth reduced power level, as indicated by block 598. Wireless IoT signals 596 are not received by GW 1 202, as indicated by X 600. However, in step 602, wireless signals 596 are successfully received by GW 2 204 and the device, e.g., sensor, application data set 1 is successfully recovered. In step 604 GW 2 204 generates and sends message 606 to NS 216 conveying the device, e.g. sensor, application data set 1. In step 608 NS 216 receives message 606 and recovers the communicated information. In step 609, NS 216 generates and sends message 610 including the device, e.g., sensor application data set 1, to application server 218. Application server 218 in step 612 receives message 612 and recovers the communicated information and forwards the recovered device, e.g. sensor, application data set 1 to the appropriate application to which it corresponds, e.g. a temperature monitoring application, a security application, a meter application, etc. In step 614 AS 218 generates and sends ACK 616 to NS 216 in response to the received set of application data of signals 596. In step 618 NS 216 receives ACK message 616, and in response in step 620, generates and sends ACK message 622, e.g., a forwarded copy version of message 616, to GW 2 204. In step 624, GW 2 204 receives ACK message 622, and in response in sep 626, generates and sends wireless IoT signals 628 communicating the ACK of message 622, to EP IoT device 302. In step 630 EP IoT device 302 receives signals 628 and recovers the communicated ACK.

EP IoT device 302 repeats the process of performing measurements, generating measurement reports and sending the measurement reports to AS 218, which are communicated via only GW 2 204 due to the TX power level setting.

In step 632 EP IoT device 302 is operated, e.g., to perform sensor measurements and generate a sensor measurement report including sensor application data set M. In step 634, EP IoT device 302 generates wireless IoT signals 636 communicating device, e.g. sensor, application data set M. Signals 636 are transmitted at the highest data rate and N-1 th. reduced power level, as indicated by block 638. Wireless IoT signals 636 are not received by GW 1 202, as indicated by X 639. However, in step 640, wireless signals 636 are successfully received by GW 2 204 and the device, e.g., sensor, application data set M is successfully recovered. In step 642 GW 2 204 generates and sends message 644 to NS 216 conveying the device, e.g. sensor, application data set M. In step 646 NS 216 receives message 644 and recovers the communicated information. In step 648, NS 216 generates and sends message 650 including the device, e.g., sensor application data set M, to application server 218. Application server 218 in step 652 receives message 650 and recovers the communicated information and forwards the recovered device, e.g. sensor, application data set M to the appropriate application to which it corresponds, e.g. a temperature monitoring application, a security application, a meter application, etc. In step 654 AS 218 generates and sends ACK 656 to NS 216 in response to the received set of application data of signals 636. In step 658 NS 216 receives ACK message 656, and in response in step 660, generates and sends ACK message 662, e.g., a forwarded copy version of message 656, to GW 2 204. In step 664, GW 2 204 receives ACK message 662, and in response in step 666, generates and sends wireless IoT signals 668 communicating the ACK of message 662, to EP IoT device 302. In step 670 EP IoT device 302 receives signals 668 and recovers the communicated ACK.

Figure 3A:
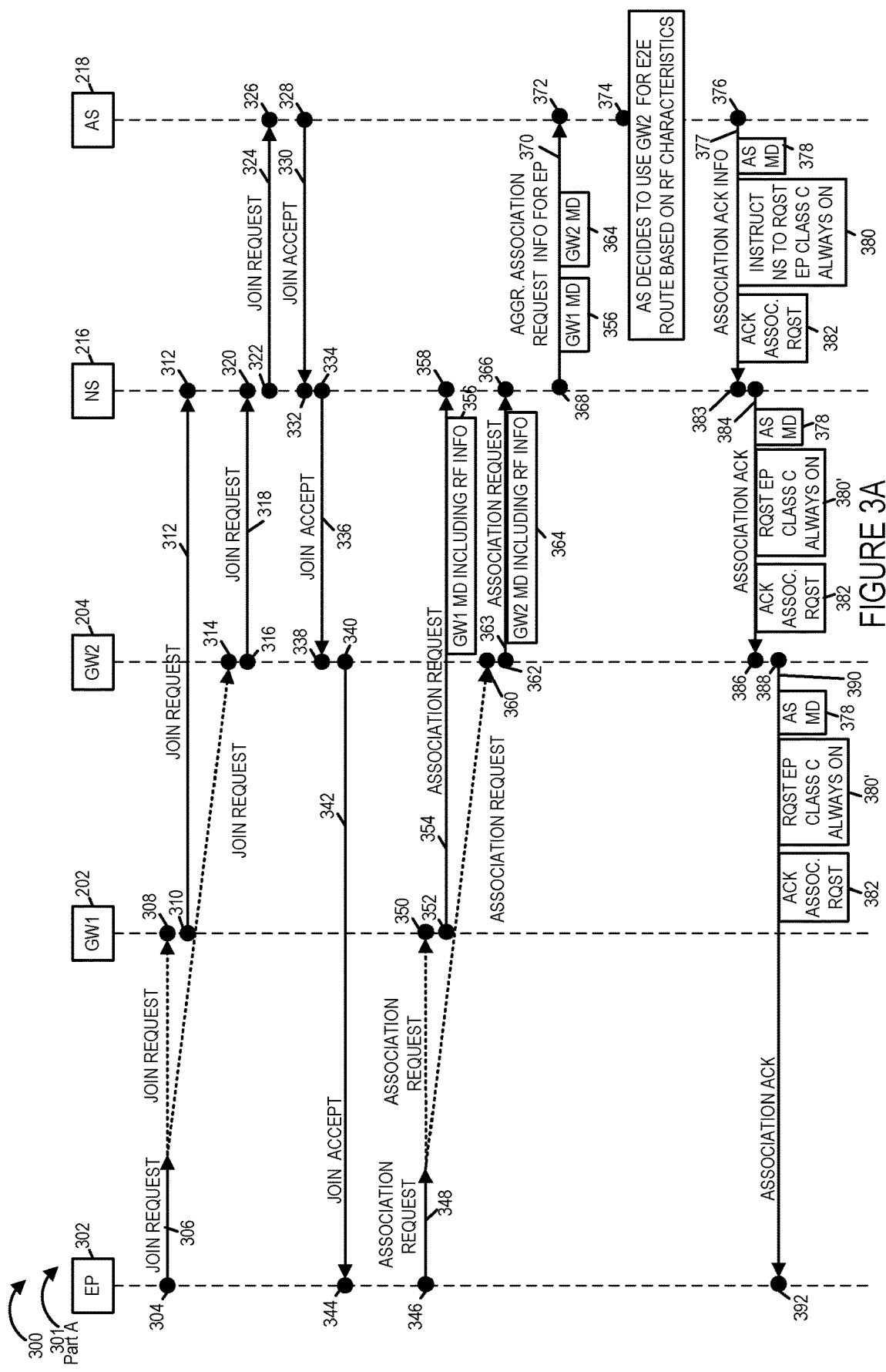
FIG. 3A is a first part of a signaling diagram used to illustrate exemplary association between an EP IoT device and a selected gateway and exemplary transmit power control (TPC) of the EP IoT device for an associated mode of operation in accordance with an exemplary embodiment.
Figure 3B:
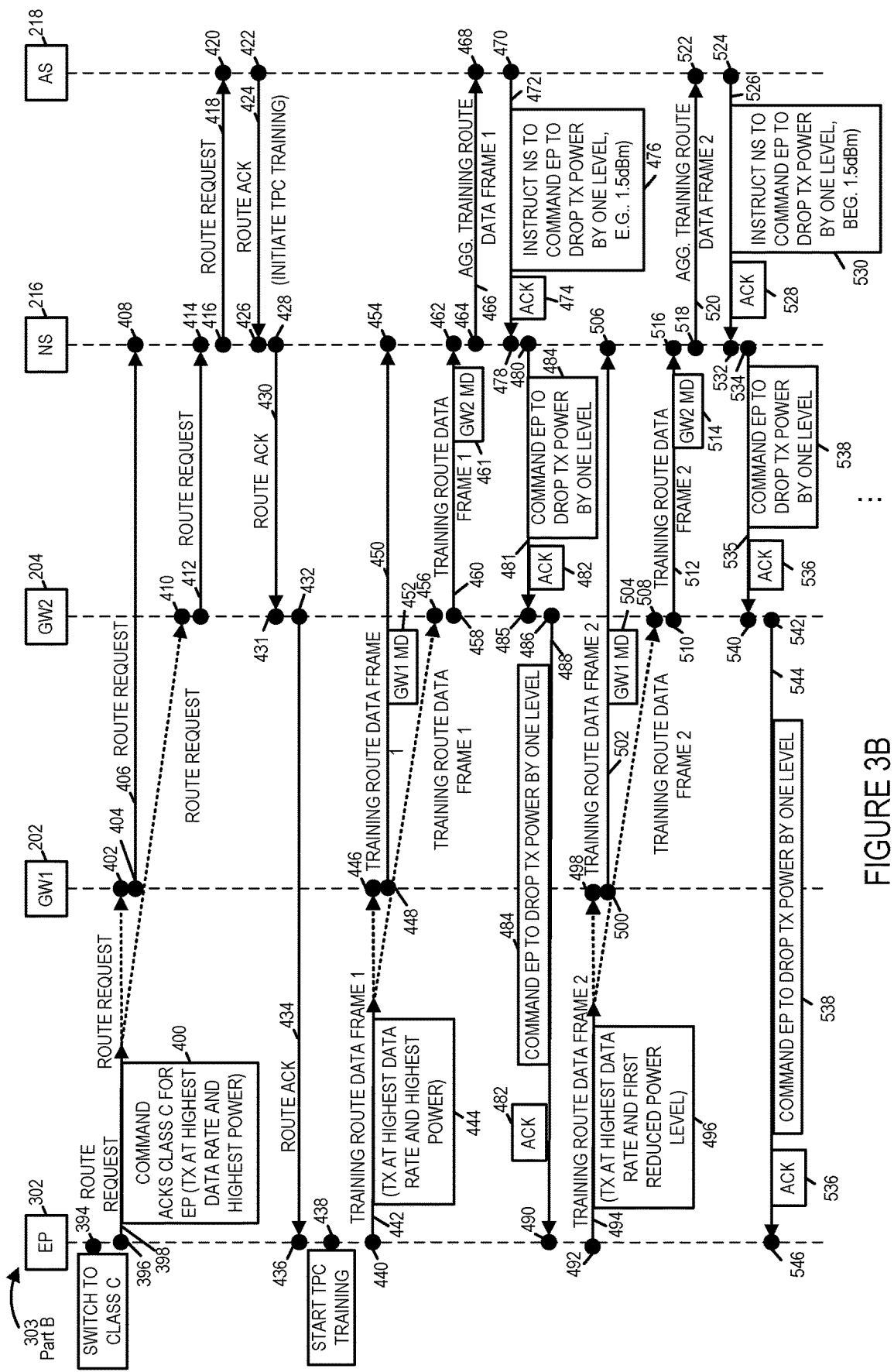
FIG. 3B is a second part of a signaling diagram used to illustrate exemplary association between an EP IoT device and a selected gateway and exemplary transmit power control (TPC) of the EP IoT device for an associated mode of operation in accordance with an exemplary embodiment.
Figure 3C:
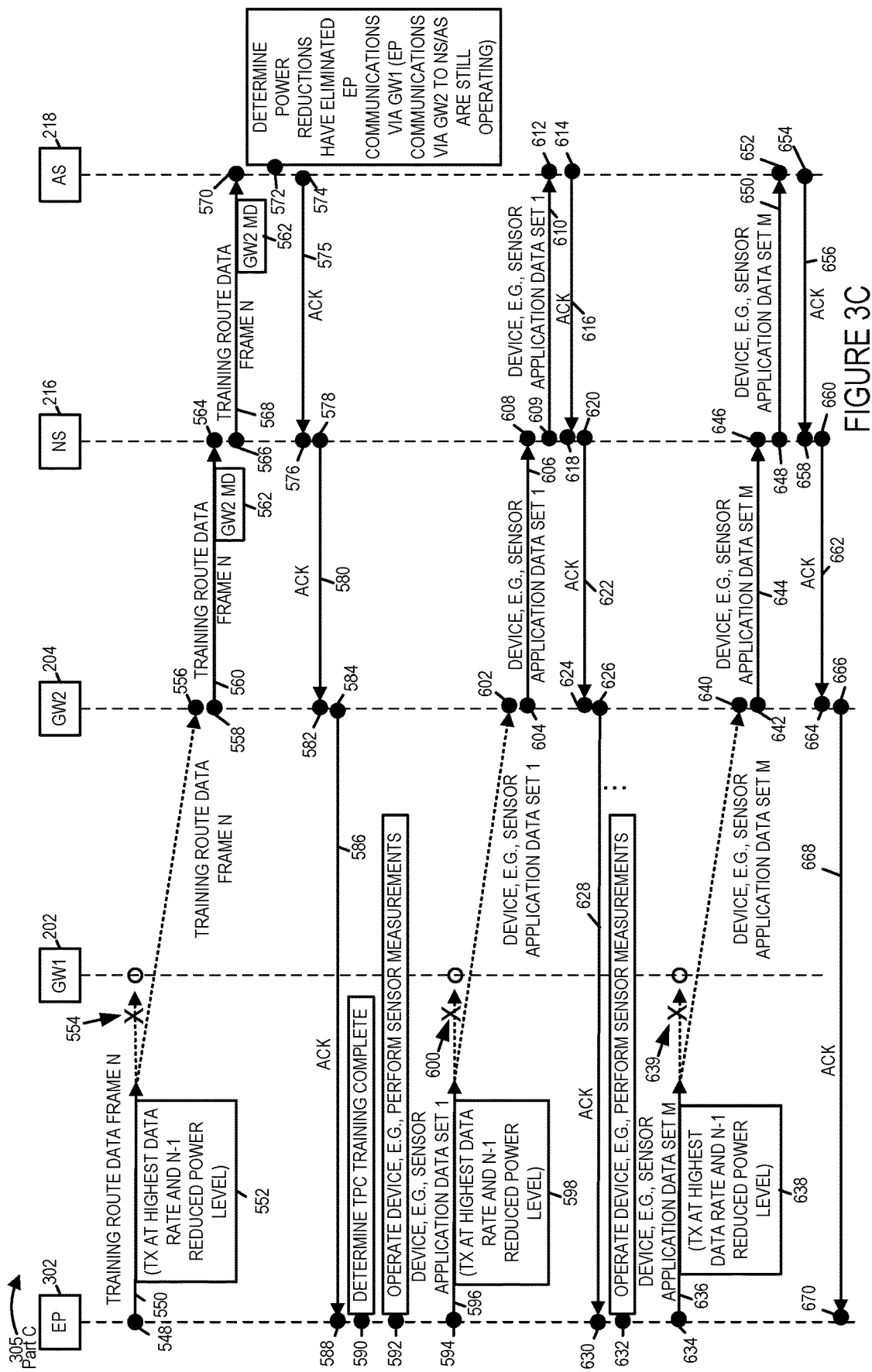
FIG. 3C is a third part of a signaling diagram used to illustrate exemplary association between an EP IoT device and a selected gateway and exemplary transmit power control (TPC) of the EP IoT device for an associated mode of operation in accordance with an exemplary embodiment.
Figure 3D:
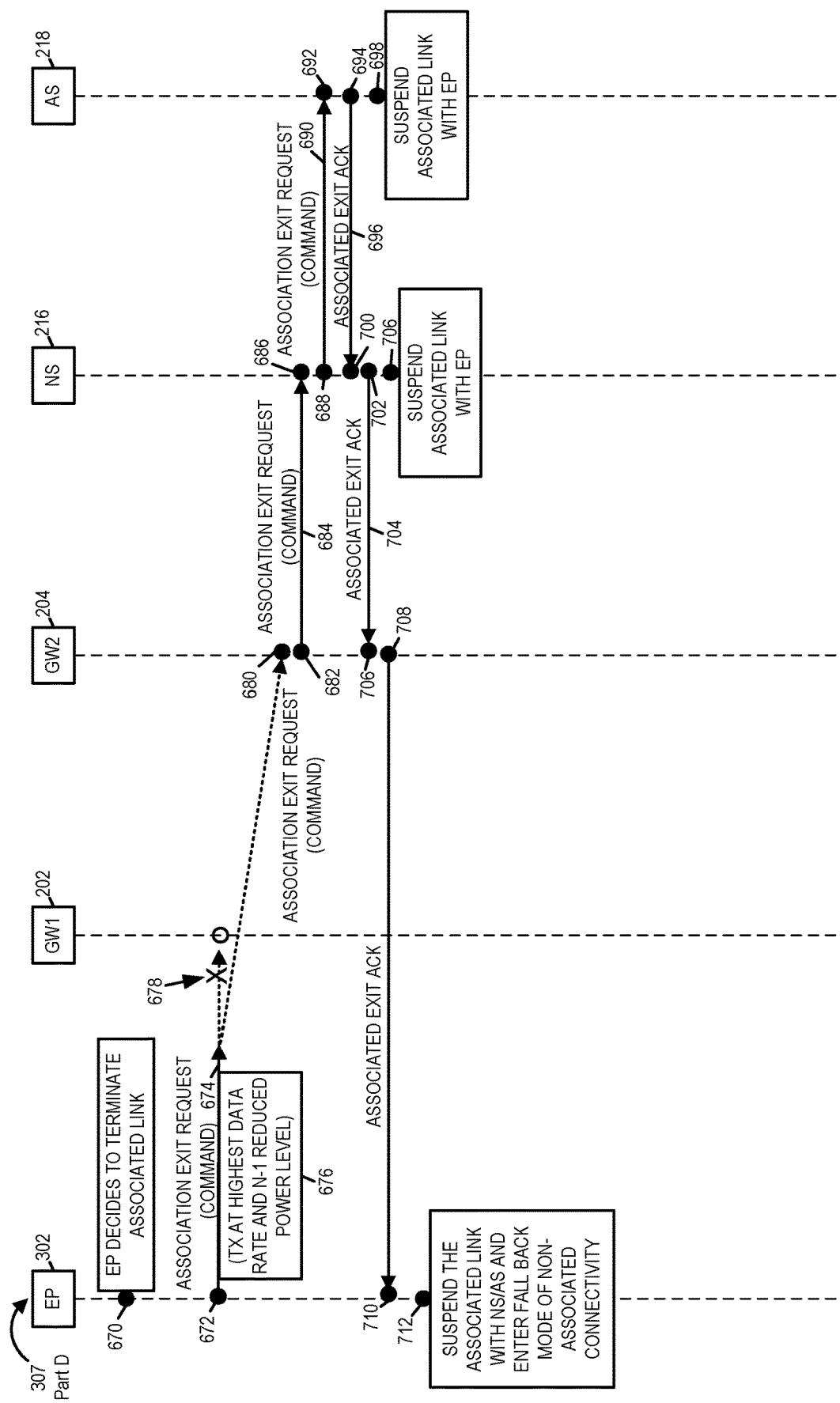
FIG. 3D is a fourth part of a signaling diagram used to illustrate exemplary association between an EP IoT device and a selected gateway and exemplary transmit power control (TPC) of the EP IoT device for an associated mode of operation in accordance with an exemplary embodiment.
Figure 3E:
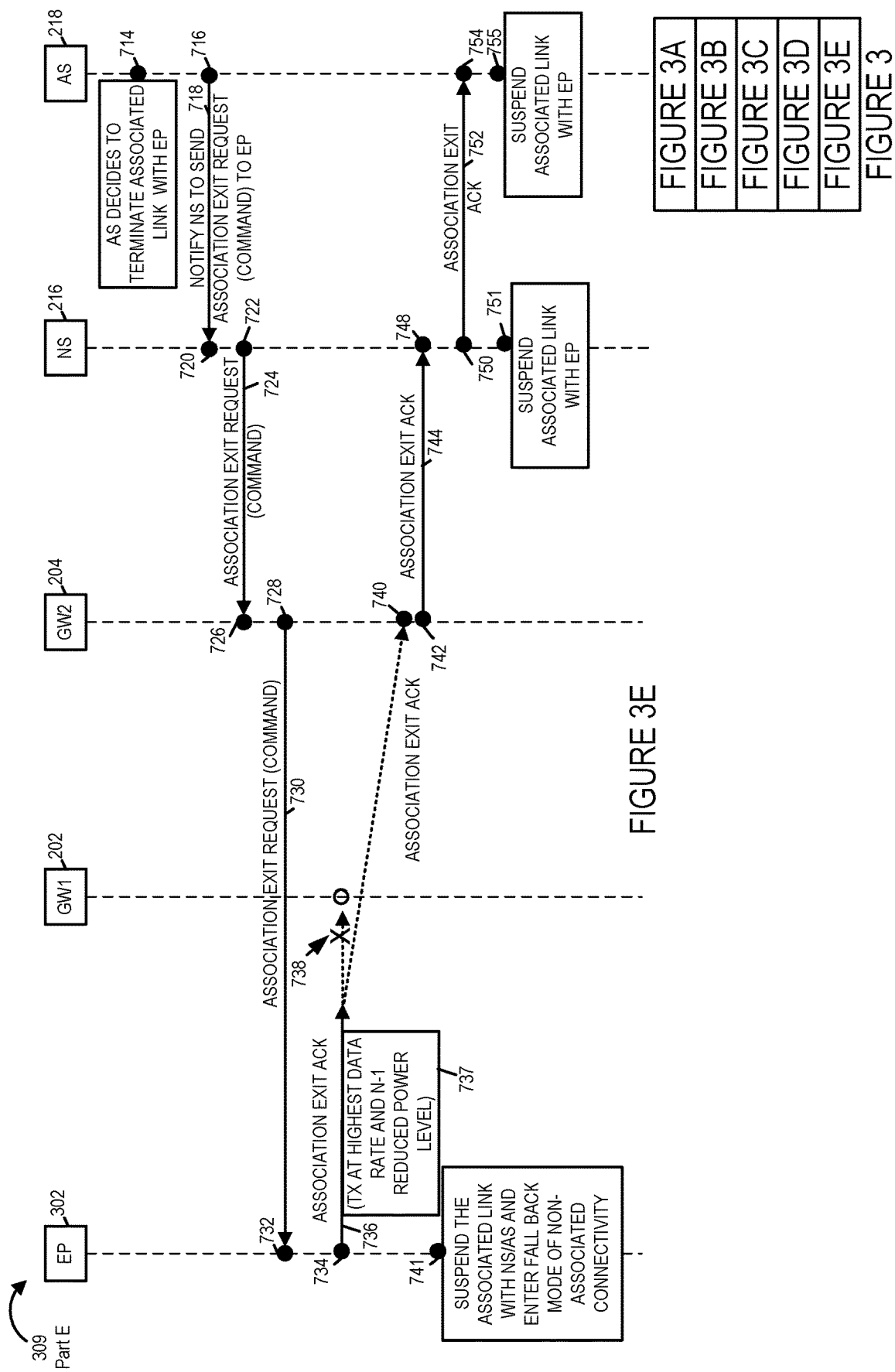
FIG. 3E is a fifth part of a signaling diagram used to illustrate exemplary association between an EP IoT device and a selected gateway and exemplary transmit power control (TPC) of the EP IoT device for an associated mode of operation in accordance with an exemplary embodiment.

FIG. 3D and FIG. 3E present two alternative scenarios in which the EP IoT device leaves an associated mode of operation. Thus operation can proceeds from the end of FIG. 3D to the beginning of FIG. 3D or from the end of FIG. 3C to the beginning of FIG. 3E.

In step 670 the EP IoT device 302 decides to terminate the associated link and the association with a single GW, which is GW 2 204. In step 672 EP IoT device 302 generates and transmits wireless IoT signals 674 including an association exit request message (command) directed to application server 218. Signals 674 are transmitted at the highest data rate and N-1 reduced power level, as indicated by block 676. In some other embodiments, IoT signals communicating an association exit request are transmitted at the maximum power level. Signals 674 are not received by GW 1 202, as indicated by X 678. However, in step 680 signals 674 are received by GW 2 204 and the association exit request (command) is successfully recovered. In step 682, GW 2 204 generates and sends association exit request message 684 to NS 216. In step 686, NS 216 receives message 684, and in response, in step 688, generates and sends association exit request message 690 to AS 218. In step 692, AS 218 receives association exit request message 690. In step 694, AS 218 generates and sends association exit ACK message 696 and sends message 696 to NS 216. In step 698 AS 218 suspends the associated link with EP 302, e.g., EP IoT device 302 is no longer associated with single GW 2 204. Thus AS 218 may now expect to receive information from EP 302 via any of the plurality of alternative GWs (GW 1 202 or GW 2 204). In step 700 NS 216 receives message 696, and in response, generates and sends associated exit ACK message 704 to GW 2 204. In step 706, GW 2 204 receives associated exit ACK message 704, and in response in step 708, generates and sends IoT wireless signals 708 to EP IoT device 302 communicating the associated exit ACK. In step 710 EP IoT device 302 receives signals 302, recovers the communicated information, and recognizes that the association exit request has been granted. In step 712 EP IoT device suspends the associated link with NS/AS and enters a fall back mode of non-associated connectivity. In various embodiments, as part of step 712 the EP IoT device 302 increases its TX power level to maximum power.

In step 714 AS 218 decides to terminate the associated link with EP IoT 302 and the association of EP IoT device 302 with a single GW, which is GW 2 204. In step 714 AS 218 generates and sends message 718 to NS 216 notifying the NS to send an association exit request (command) to EP IoT device 320. In step 720 NS 216 receives message 718, and in response in step 722, generates and sends association exit request (command) message 724 to GW 2 204, which is received by GW 2 204 in step 726. In step 726, GW 2 204 generates and transmits IoT wireless signals 730 communicating the association exit request (command) to EP IoT device 302. In step 732, EP IoT device 302 receives signals 732, and in response in step 734 generates and transmits IoT wireless signals 736 including an association exit ACK. Signals 736 are transmitted at the highest data rate and N-1 reduced power level, as indicated by box 737. In some other embodiments a signal communicating an association exit ACK are transmitted at the higher power level.

Signals 736 are not received by GW 1 202, as indicated by X 738. However, in step 740 signals 736 are received by GW 2 204 and the association exit request ACK is successfully recovered.

In step 741 EP IoT device 302 suspends the associated link with NS/AS and enters a fall back mode of non-associated connectivity. In various embodiments, as part of step 741 the EP IoT device 302 increases its TX power level to maximum power.

In step 742, GW 2 204 generates and sends association ACK message 744 to NS 216. In step 748, NS 216 receives message 744, and in response, in step 750, generates and sends association exit ACK message 752 to AS 218. In step 751 NS 216 suspends the associated link with EP 302.

In step 754, AS 218 receives association exit ACK message 752. In step 755 AS 218 suspends the associated link with EP IoT device 302, e.g. EP IoT device 302 is no longer associated with single GW 2 204. Thus AS 218 may now expect to receive information from EP IoT device 302 via any of the plurality of alternative GWs (GW 1 202 or GW 2 204).

Figure 4A:
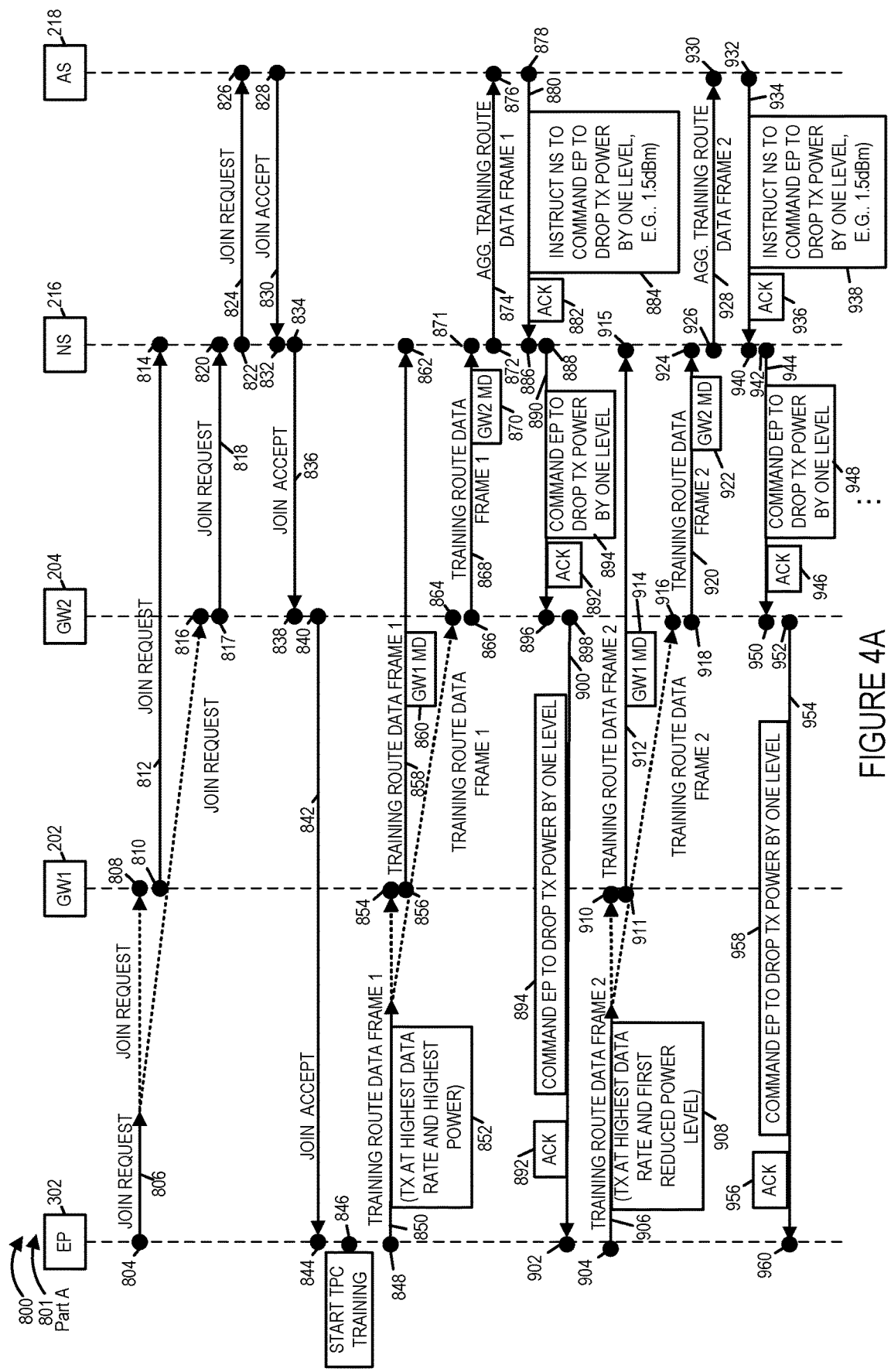
FIG. 4A is a first part of a signaling diagram used to illustrate exemplary transmit power control (TPC) of an EP IoT device for a non-associated mode of operation in accordance with an exemplary embodiment.
Figure 4B:
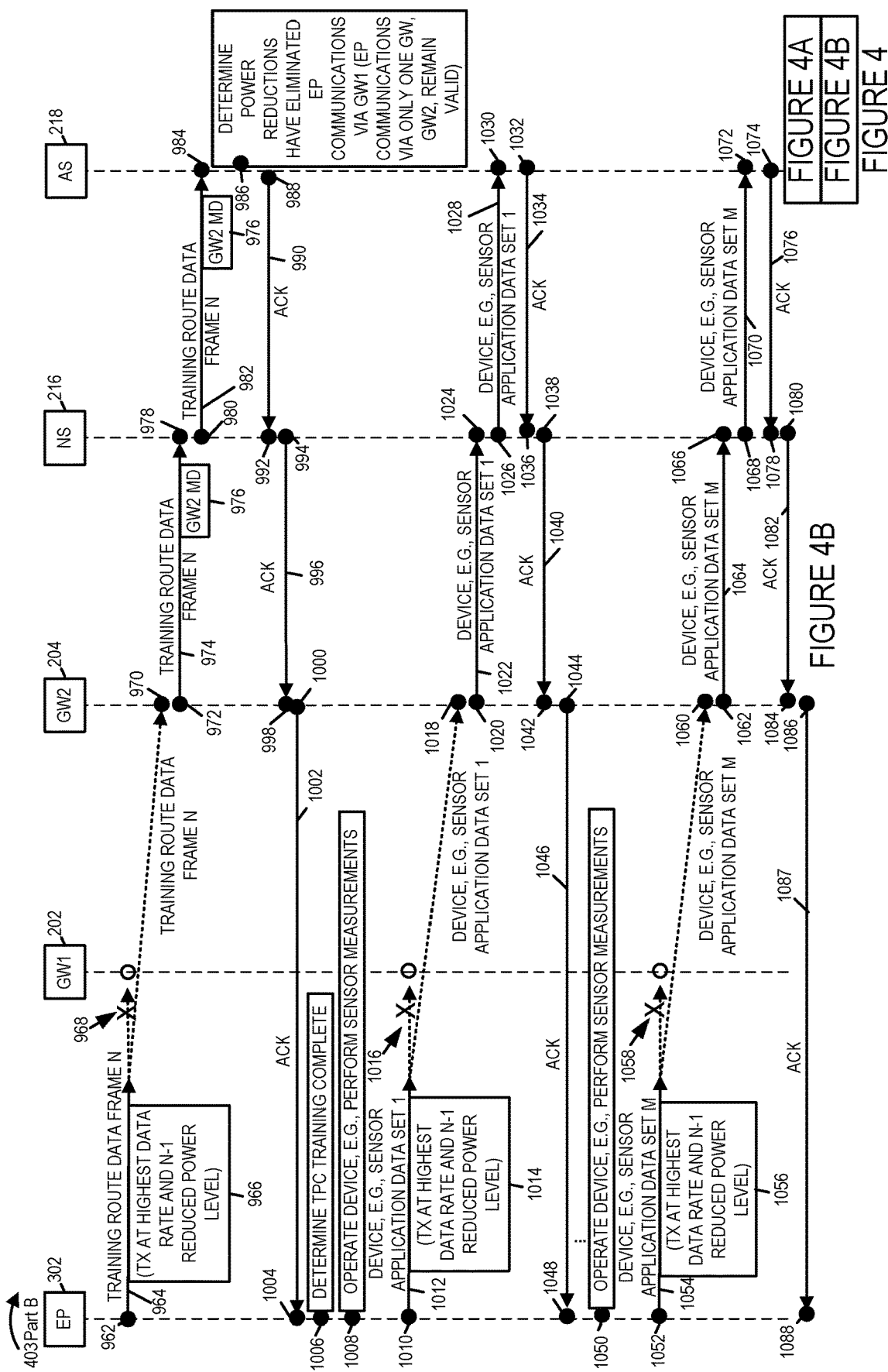
FIG. 4B is a second part of a signaling diagram used to illustrate exemplary transmit power control (TPC) of an EP IoT device for a non-associated mode of operation in accordance with an exemplary embodiment.

FIG. 4, comprising the combination of FIG. 4A and FIG. 4B, is an exemplary signaling drawing 800, comprising Part A 801 and Part B 803, in accordance with an exemplary embodiment. Exemplary signaling drawing 800 includes an exemplary end point IoT device 302, GW 1 202, GW 2 204, Network Server (NS) 216 and Application Server (AS) 218. Exemplary EP IoT device 302 is, e.g., any of the IoT devices (220, 222, 224, 226, 228, 230, 232, . . . , 234) of system 200 of FIG. 2. Exemplary signaling drawing 800 illustrates: exemplary EP IoT device transmit power control (TPC) training operations under the direction of a control server, a determination of a transmit power level to be used by the EP IoT for application data transmission while in non-associated mode, said determined power being lower than the maximum allowable TX power, and the transmission of EP IoT application data at the determined TX power level, with the EP IoT application data being received by a single IoT GW.

In step 804, EP IoT device 302 generates and transmits wireless IoT broadcast signals 806 communicating a join request. In step 808 GW 1 202 receives signal 806. In step 810 GW 1 202 generates and sends message 812 communicating the join request to network server (NS) 216. In step 814 the network server 216 receives message 812 and recovers the join request from GW 1 202. In step 818 GW 2 204 receives signal 806. In step 817 GW 2 204 generates and sends message 818 communicating the join request to network server 216. In step 820 the network server 216 receives message 818 and recovers the join request from GW 2 204. In step 822 the network server 216 generates and sends message 824 communicating the join request to application server (AS) 218. IN step 816 AS 218 receives join request message 824. In step 826, in response to the received join request, the AS 218 generates and send message 830 communicating a join accept to NS 216. In step 832, NS 216 receives message 830, and in step 834, the NS 216 generates and sends message 836 communicating the join accept to GW 2 204. In step 840 GW 2 204 generates and sends wireless IoT signals 842 communicating the join accept to EP IoT device 302. In step 844 EP IoT device 302 receives signals 842 and recovers the join accept.

In step 846, EP IoT device 302 starts transmit power control (TPC) training operations. In some embodiments, EP IoT device starts the TPC training operations in response to a received Join accept. In some embodiment, the EP IoT device starts the TPC training operation in response to a command sent from a control server, e.g., AS 218, e.g., a command to start TPC training operation for non-associated mode. In some such embodiments, the command instructs the EP IoT device 802 to set the data rate to the highest data rate and initially set the TX power level to the highest power level.

In step 848, the EP IoT device 302 generates and transmits IoT wireless signals 850 including training route data frame 1. The IoT wireless signals 850 including training route data frame 1 are transmitted, e.g., broadcast, at the highest data rate and highest transmit power level, as indicated by box 852. In step 854 GW 1 202 successfully receives the IoT signals 850 and recovers the communicated training route data frame 1. In step 856 GW 1 202 generates and sends message 868 including training route data frame 1 and GW 1 metadata 860, e.g., including GW 1 ID info, received RF info, e.g., received signal strength info, received SNR info, etc., to network server 216. In step 862 network server 216 receives message 858 and recovers the communicated information including the training route data frame 1 and the GW 1 metadata 860. In step 866, GW 2 204 successfully receives the IoT signals 850 and recovers the communicated training route data frame 1. In step 866 GW 2 204 generates and sends message 868 including training route data frame 1 and GW 2 metadata 870, e.g., including GW 2 ID info, received RF info, e.g., received signal strength info, received SNR info, etc., to network server 216. In step 871 network server 216 receives message 868 and recovers the communicated information including the training route data frame 1 and the GW 2 metadata 870. In step 872 the network server 216 aggregates information from receives messages 858 and 868, generates aggregated training route data frame 1 message 874 including training route data frame 1, GW 1 metadata 860 and GW 2 metadata 870 and sends message 874 to application server 218. In step 876, the AS 218 receives message 874 and recovers the communicated information. In step 878 the AS 218 determines, based on the received information of message 874 that both GW 1 202 and GW 2 204 have successfully received the training route data frame 1, decides to reduce the transmission power level of EP IoT device 302, generates message 880 and sends message 880 to NS 216. Message 880 includes an acknowledgment 882, acknowledging reception of the training route data frame 1, and an instruction 884 to the NS 216 to command the EP 302 to drop transmit (TX) power by one level, e.g. 1.5 dBm. In step 886, NS 216 receives message 880 and recovers the communicated information. In step 888 NS 216 generates and sends message 890 to GW 2 204. Message 890 includes an acknowledgment 892, acknowledging reception of the training route data frame 1, and a command 894 to the EP 302 to drop transmit (TX) power by one level, e.g. 1.5 dBm. In step 896 GW 2 204 receives message 490 and recovers the communicated information. In step 898 GW 2 204 generates and transmits IoT wireless signals 900 to EP IoT device 302 communicating ACK 892 and the command 894 to drop the TX power by one level.

In step 902, EP IoT device 302 receives signals 900, recovers the communicated information and drops its TX power by one level.

In step 904, the EP IoT device 302 generates and transmits IoT wireless signals 906 including training route data frame 2. The IoT wireless signals 906 including training route data frame 2 are transmitted, e.g., broadcast, at the highest data rate and first reduced transmit power level, as indicated by box 908. In step 910, GW 1 202 successfully receives the IoT signals 906 and recovers the communicated training route data frame 2. In step 911 GW 1 202 generates and sends message 912 including training route data frame 2 and GW 1 metadata 914, e.g., including GW 1 ID info, received RF info, e.g., received signal strength info, received SNR info, etc., to network server 216. In step 915 network server 216 receives message 912 and recovers the communicated information including the training route 2 data frame and the GW 1 metadata 914. In step 916, GW 2 204 successfully receives the IoT signals 906 and recovers the communicated training route data frame 2. In step 918 GW 2 204 generates and sends message 920 including training route data frame 2 and GW 2 metadata 922, e.g., including GW 2 ID info, received RF info, e.g., received signal strength info, received SNR info, etc., to network server 216. In step 5924 network server 216 receives message 920 and recovers the communicated information including the training route 2 data frame and the GW 2 metadata 922. In step 926 the network server 216 aggregates information from receives messages 912 and 920, generates aggregated training route data frame 2 message 928 including training route data frame 2, GW 1 metadata 914 and GW 2 metadata 922 and sends message 928 to application server 218. In step 930, the AS 218 receives message 928 and recovers the communicated information. In step 932 the AS 218 determines, based on the received information of message 928 that both GW 1 202 and GW 2 204 have successfully received the training route data frame 2, decides to reduce the transmission power level of EP IoT device 302, generates message 934 and sends message 934 to NS 216. Message 934 includes an acknowledgment 936, acknowledging reception of the training route data frame 2, and an instruction 938 to the NS 216 to command the EP 302 to drop transmit (TX) power by one level, e.g. 1.5 dBm. In step 940, NS 216 receives message 934 and recovers the communicated information. In step 942 NS 216 generates and sends message 944 to GW 2 204. Message 944 includes an acknowledgment 946, acknowledging reception of the training route data frame 2, and a command 948 to the EP 302 to drop transmit (TX) power by one level, e.g. 1.5 dBm. In step 950 GW 2 204 receives message 944 and recovers the communicated information. In step 952 GW 2 204 generates and transmits IoT wireless signals 954 to EP IoT device 302 communicating ACK 956 and the command 958 to drop the TX power by one level. In step 960, EP IoT device 302 receives signals 954, recovers the communicated information and drops its TX power by one level.

Additional iterations of a frame of training route data be sent and the EP IoT device 302 being subsequently commanded to reduce power, e.g., in response to the AS 218 determining that both GW 1 202 and GW 2 204 successfully received the frame of training route data may be, and sometimes are, performed.

In step 962, the EP IoT device 302 generates and transmits IoT wireless signals 964 including training route data frame N. The IoT wireless signals 964 including training route data frame N are transmitted, e.g., broadcast, at the highest data rate and N-1 th. reduced transmit power level, as indicated by box 966. GW 1 202 does not successfully receives the IoT signals 964 as indicated by X 968. In step 970, GW 2 204 successfully receives the IoT signals 964 and recovers the communicated training route data frame N. In step 972 GW 2 204 generates and sends message 974 including training route data frame N and GW 2 metadata 976, e.g., including GW 2 ID info, received RF info, e.g., received signal strength info, received SNR info, etc., to network server 216. In step 978 network server 216 receives message 974 and recovers the communicated information including the training route data frame N and the GW 2 metadata 976. In step 980 the network server generates training route data frame N message 982 including training route data frame N, and GW 2 metadata 976 and sends message 982 to application server 218. In step 984, the AS 218 receives message 982 and recovers the communicated information. In step 986 the AS 218 determines, based on the received information of message 982 that power reductions have eliminated EP 302 communications via GW 1 202, that EP 302 communications via GW 2 204 to the NS 216/AS 218 are still operating and are satisfactory, and that TPC training for EP IoT device 302 is complete, e.g. since valid communications now remain via only one gateway. In step 988, AS 218 generates and sends ACK message 990 to NS 216, said message conveying that training route data frame N was successfully received, that TPC training is complete, that TX power should remain at the current setting level, and that it is ok to proceed with sending sensor measurement reports using the current TX power level. In step 992 NS 216 receives ACK message 990. In response, in step 994, NS 216 generates and sends ACK message 996, e.g., a forwarded version of ACK 990 communicating information of ACK message 990, to GW 2 204. In step 998, GW 2 204 receives ACK message 996, and recovers the information communicated in message 996. In step 1000 GW 2 204 generates and transmits IoT wireless signals 1002 communicating the information of ACK message 996, to EP IoT device 302. In step 1004, EP IoT device 302 receives signals 1002 and recovers the communicated information.

In step 1006 EP IoT device 302 determines that TPC training is complete and that the current TX power level should be used. In step 1008 EP IoT device 302 is operated, e.g., to perform sensor measurements and generate a sensor measurement report including sensor application data set 1. In step 1010, EP IoT device 302 generates wireless IoT signals 1012 communicating device, e.g. sensor, application data set 1. Signals 1012 are transmitted at the highest data rate and N-lth reduced power level, as indicated by block 1014. Wireless IoT signals 1012 are not received by GW 1 202, as indicated by X 1016. However, in step 1018, wireless signals 1012 are successfully received by GW 2 204 and the device, e.g., sensor, application data set 1 is successfully recovered. In step 1020 GW 2 204 generates and sends message 1022 to NS 216 conveying the device, e.g. sensor, application data set 1. In step 1024 NS 216 receives message 1022 and recovers the communicated information. In step 1026, NS 216 generates and sends message 1028 including the device, e.g., sensor, application data set 1, to application server 218. Application server 218 in step 1030 receives message 1028 and recovers the communicated information and forwards the recovered device, e.g. sensor, application data set 1 to the appropriate application to which it corresponds, e.g. a temperature monitoring application, a security application, a meter application, etc. In step 1032 AS 218 generates and sends ACK 1034 to NS 216 in response to the received set of application data of signals 1012. In step 1036 NS 216 receives ACK message 1034, and in response in step 1038, generates and sends ACK message 1040, e.g., a forwarded copy version of message 1034, to GW 2 204. In step 1042, GW 2 204 receives ACK message 1040, and in response in step 1044, generates and transmits wireless IoT signals 1046 communicating the ACK of message 1040, to EP IoT device 302. In step 1048 EP IoT device 302 receives signals 1046 and recovers the communicated ACK.

EP IoT device 302 repeats the process of performing measurements, generating measurement reports and sending the measurement reports to AS 218, which are communicated via only GW 2 204 due to the TX power level setting.

In step 1050 EP IoT device 302 is operated, e.g., to perform sensor measurements and generate a sensor measurement report including sensor application data set M. In step 1052, EP IoT device 302 generates wireless IoT signals 1054 communicating device, e.g. sensor, application data set M. Signals 1054 are transmitted at the highest data rate and N-1 th. reduced power level, as indicated by block 1056. Wireless IoT signals 1054 are not received by GW 1 202, as indicated by X 1058. However, in step 1060, wireless signals 1054 are successfully received by GW 2 204 and the device, e.g., sensor, application data set M is successfully recovered. In step 1062 GW 2 204 generates and sends message 1064 to NS 216 conveying the device, e.g. sensor, application data set M. In step 1066 NS 216 receives message 1064 and recovers the communicated information. In step 1068, NS 216 generates and sends message 1070 including the device, e.g., sensor, application data set M, to application server 218. Application server 218 in step 1072 receives message 1070 and recovers the communicated information and forwards the recovered device, e.g. sensor, application data set M to the appropriate application to which it corresponds, e.g. a temperature monitoring application, a security application, a meter application, etc. In step 1074 AS 218 generates and sends ACK 1076 to NS 216 in response to the received set of application data of signals 1054. In step 1078 NS 216 receives ACK message 1076, and in response in step 1080, generates and sends ACK message 1082, e.g., a forwarded copy version of message 1076, to GW 2 204. In step 1084, GW 2 204 receives ACK message 1082, and in response in step 1086, generates and sends wireless IoT signals 1087 communicating the ACK of message 662, to EP IoT device 302. In step 1088 EP IoT device 302 receives signals 1087 and recovers the communicated ACK.

Figure 5:
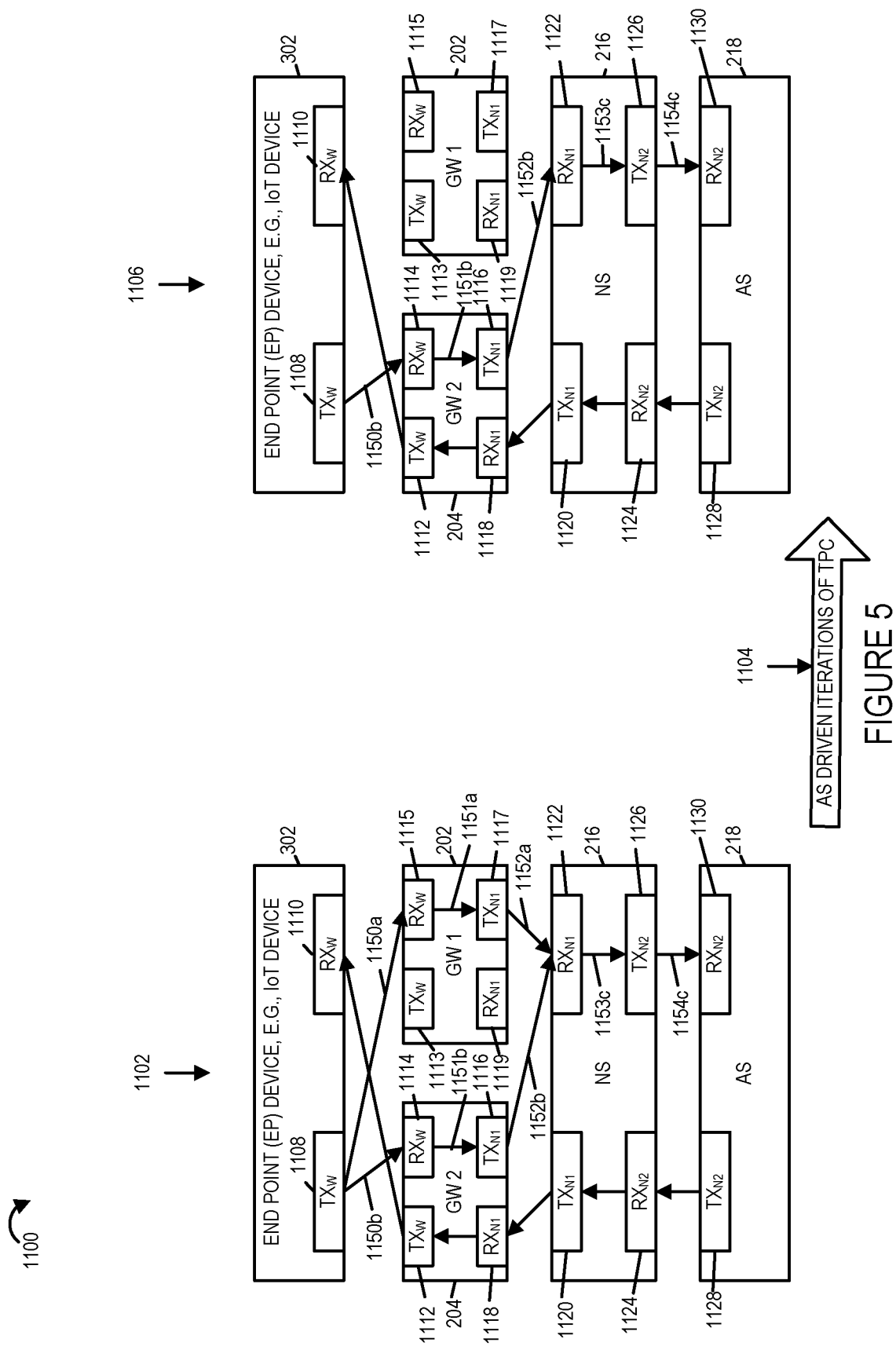
FIG. 5 is a drawing illustrating an exemplary end point (EP) Internet-of-Things (IoT) device initially successfully communicating via two communications paths, each communications path including a different gateway, and then after transmit power control (TPC) training which results in a reduction in EP IoT transmit power, successfully communicating via only one communications path corresponding to one gateway, in accordance with an exemplary embodiment.

FIG. 5 is a drawing 1100 illustrating an exemplary end point (EP) Internet-of-Things (IoT) device 302 initially successfully communicating via two communications paths, each communications path including a different gateway, and then after transmit power control (TPC) training which results in a reduction in EP IoT transmit power, successfully communicating via only one communications path corresponding to one gateway, in accordance with an exemplary embodiment. EP IoT device 302 includes a wireless transmitter TXW 1108 and a wireless receiver RXW 1110. GW 1 202 includes a wireless transmitter TXW 1113, a wireless receiver RXW 1115, a network receiver RXN1 1119 and a network transmitter TXN1 1117. GW 2 204 includes a wireless transmitter TW 1112, a wireless receiver RXW 1114, a network receiver RXN1 1118 and a network transmitter TXN1 1116. Network Server (NS) 216 includes a first network transmitter TXN1 1120, a first network receiver RXN1 1122, a second network transmitter RXN2 1124 and a second network transmitter TXN2 1126. In some embodiments, the first and second network transmitters of the NS 216 are the same component. In some embodiments, the first and second network receivers of the NS 216 are the same component. Application server (AS) 218 includes network transmitter TXN2 1128 and network receiver RXN2 1130.

Drawing portion 1102 illustrates exemplary EP IoT device 302 initially communicating with the application server, e.g., sending information to the AS 218, via a first communications path (EP TXW->GW 1 RXW->GW1 TXN1->GW1 TXN1->NS RXN1->NS RXN2->AS RXN2) which includes GW 1 202 and via a second communications path (EP TXW->GW 2 RXW->GW2 TXN1->GW2 TXN1->NS RXN1->NS RXN2->AS RXN2), which includes GW 2 204. First communications path is illustrated by arrows 1150a, 1151a, 1152a, 1153c and 1154c. Second communications path is illustrated by arrows 1150b, 1151b, 1152b, 1153c and 1154c in drawing portion 1102. At this point in time the EP 302 has very strong links, e.g., due to the high transmission power level. EP 302 is seen by multiple GWs (202, 204). In this example, the stronger connection is between EP 302 and GW 2 204. EP device 302 is "jamming" GWs (GW1 202) that need not be serving it. GW 1 202 could be better used to serve another EP device in the communications system at this time. Network capacity could be increased if EP 302 were to lower its TX power.

Larger Arrow 1104 represents application server (AS) driven iterations of TPC with regard to controlling EP 302, e.g., reducing TX power during each iteration, until only one GW is able to successfully receive IoT wireless signals transmitted from the EP IoT device 302 using the highest data rate. In this example, GW 1 202 drops out resulting in a single end-to-end (E2E) path being used for communications between the EP IoT device 302 and the AS 218, said single E2E communications path including GW 2 204.

AS 218 driven iterations include the following. Commands are issued by the AS 218: i) set device 302 at highest data rate (SF8BW500); ii) at each iteration command GW TX power to decrease by 1.5 dBM; iii) at each iteration AS 218 instructs NS 216 to issue ADR command to device 302 to drop TX power by 1.5 dBm. The exit criteria for the loop is: device seen by only one GW, which is GW 2 302, and, in some embodiments, device virtually associated to GW 2 302.

Drawing portion 1106 illustrates exemplary EP IoT device 302 communicating with the AS 218, e.g., sending information to the AS 218, via the remaining communications path (EP TXW->GW 2 RXW->GW2 TXN1->GW2 TXN1->NS RXN1->NS RXN2->AS RXN2), which includes GW 2 204. The remaining communications path is illustrated by arrows 1150b, 1151b, 1152b, 1153c and 1154c in drawing portion 1106. At this point is time EP 302 is transmitting at the right level in order to be received by the network, e.g. via only GW 2 204. Other GWs in the system, e.g., GW 1 202 that are not associated with EP 302 are available and free to process more devices. As a result, network capacity scales up.

It should be appreciated that by reducing the transmit power of EP IoT device to eliminate redundant wireless IoT links not only has benefit of a reduction of overall interference in the wireless communications spectrum with potentially increased throughput, but additional benefits are gained including, e.g., a reduction in battery power expended by EP IoT device 302, a reduction in the amount of processing by GW 1 202, network server 1153 and AS 218, and a reduction in the amount of backhaul signaling traffic communicated between the gateways and the network server.

Figure 6A:
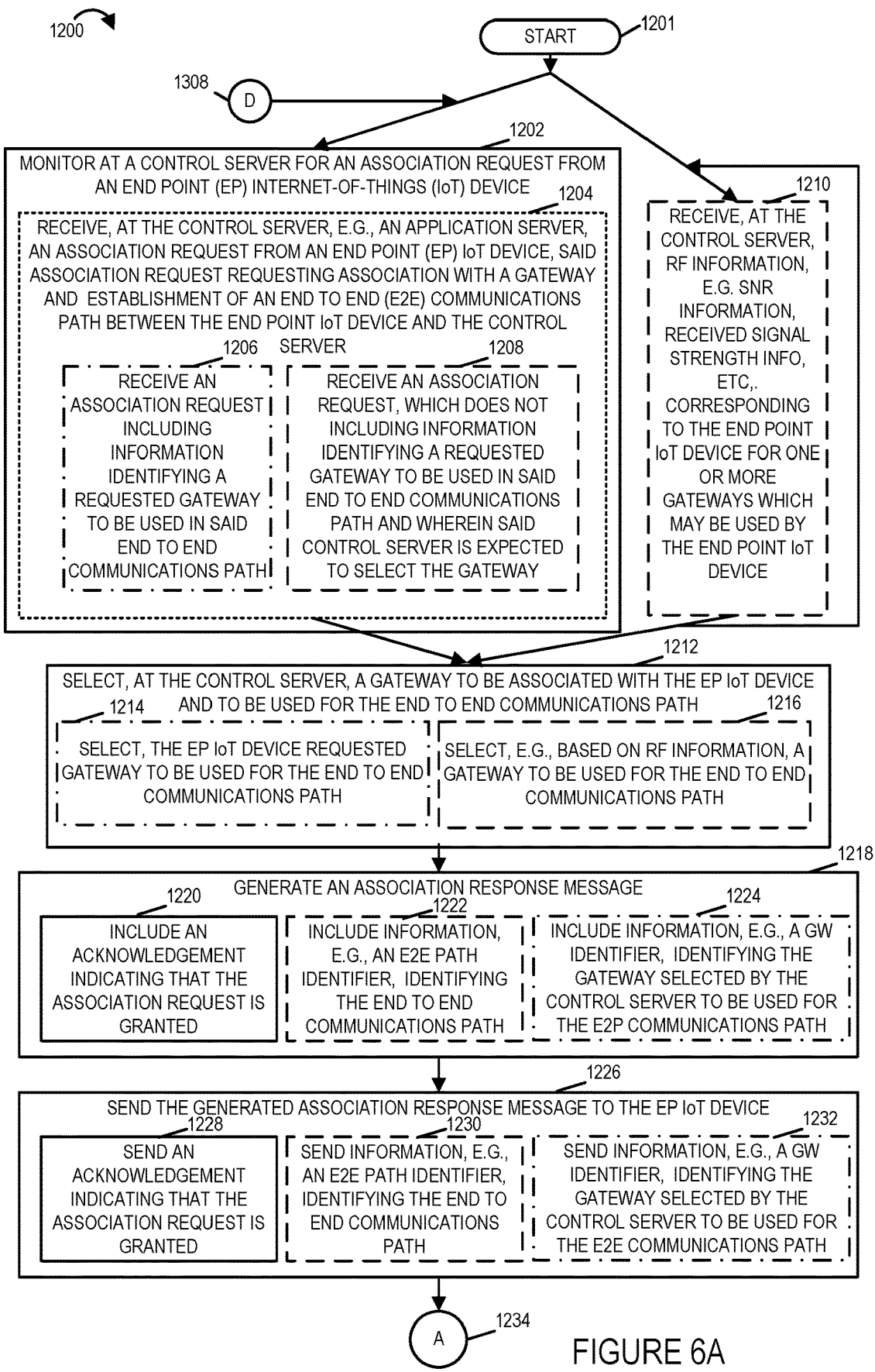
FIG. 6A is a first part of a flowchart of an exemplary method of operating a control server, e.g. an application server, in accordance with an exemplary embodiment.
Figure 6B:
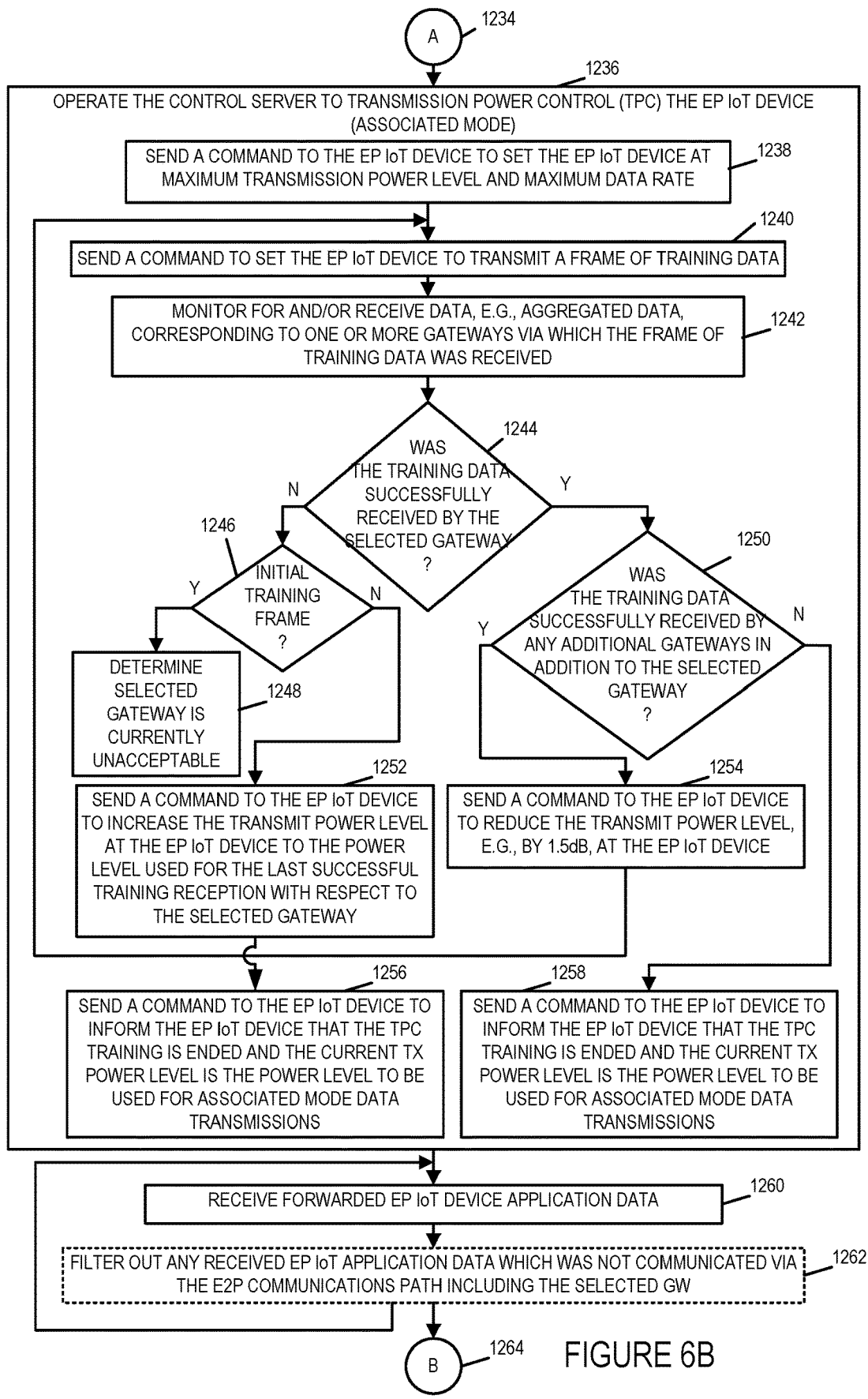
FIG. 6B is a second part of a flowchart of an exemplary method of operating a control server, e.g. an application server, in accordance with an exemplary embodiment.
Figure 6C:
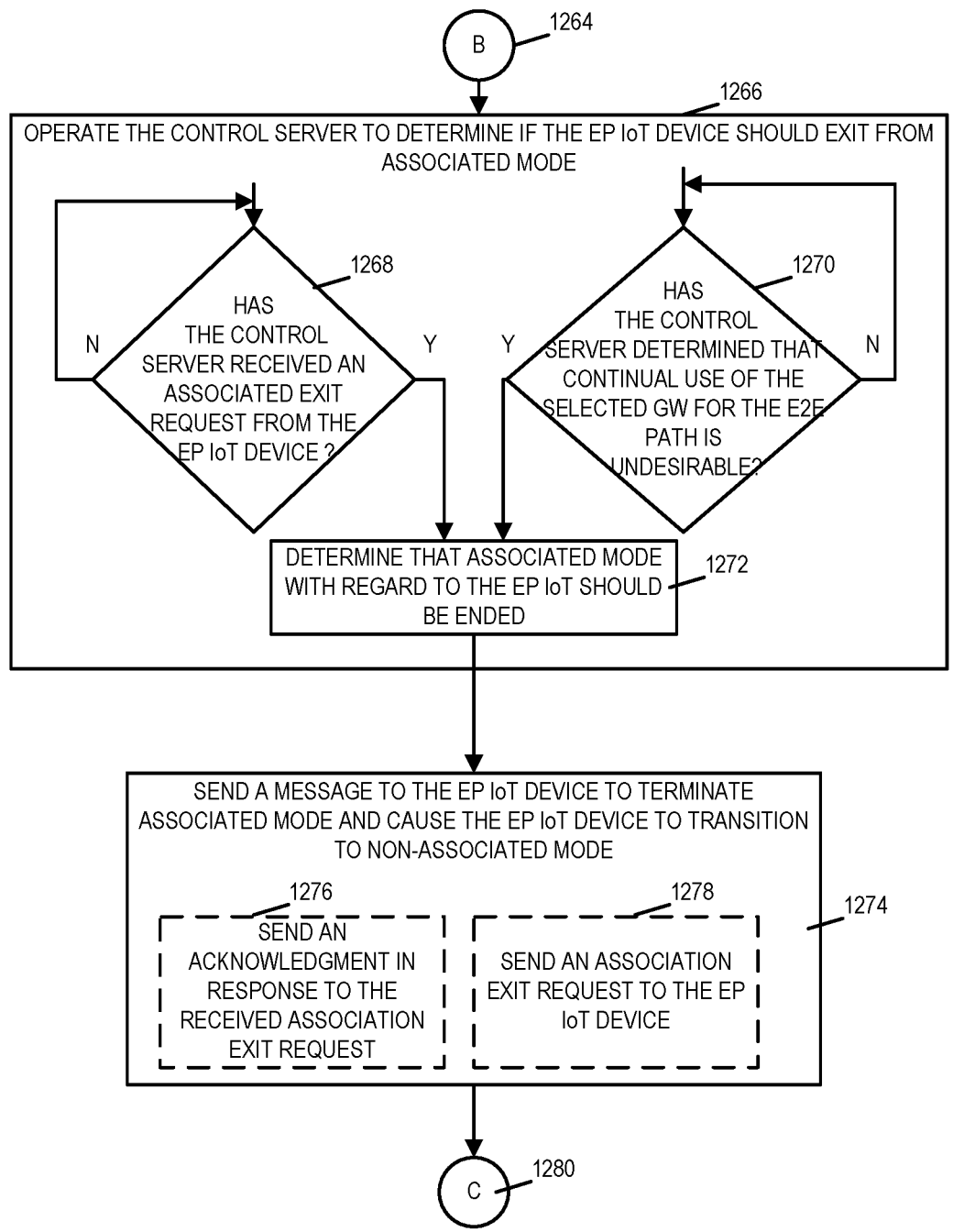
FIG. 6C is a third part of a flowchart of an exemplary method of operating a control server, e.g. an application server, in accordance with an exemplary embodiment.

FIG. 6, comprising the comprising the combination of FIG. 6A, FIG. 6B, FIG. 6C and FIG. 6D, is a flowchart 1200 of an exemplary method of operating a control server, e.g. an application server, e.g., in a communications system including the control server, a network server, a plurality of end point (EP) Internet of Things (IoT) devices, and a plurality of IoT Gateways (GWs), in accordance with an exemplary embodiment.

Operation starts in step 1201 in which the control server is powered on and initialized. Operation proceeds from step 1201 to step 1202 and step 1210. In step 1202 the control server, e.g., an application server (AS), monitors for an association request from an end point (EP) IoT device. Step 1202 may, and sometimes does, include step 1204 in which the control server receives an association request from an EP IoT device, said association request requesting association with a gateways and establishment of an end to end (E2E) communications path between the EP IoT device and the control server, wherein the E2E communications path includes a selected gateway, e.g., a selected IoT gateway, and a wireless link between the EP IoT device and the selected GW. In some embodiments, each iteration of step 1204 includes one of step 1206 and step 1208. In step 1206 the control server receives an association request including information identifying a requested gateway to be used in the E2E communications path. In step 1208 the control server receives an association request, which does not include information identifying a requested gateway to be used in said E2E communications path and wherein said control server is expected to select the gateway to be used in said E2E communications path.

Returning to step 1201, in step 1210, which is performed on an ongoing basis, the control server receives RF information, e.g., SNR information, received signal strength information, etc., corresponding to the EP IoT device for one or more gateways which may be used by the IoT device. Operation proceeds from steps 1204 and 1210 to step 1212.

In step 1212 the control server selects a gateway to be associated with the EP IoT device and to be used for the E2E communications path. In some embodiments, each iteration of step 1212 includes one of steps 1214 and 1216. In step 1214 the control server selects the EP IoT device requested gateway to be used for the E2E communications path. In step 1216 the control server selects, e.g., based on RF information, a gateway to be used for the E2E communications path. For example, the control server selects the gateway with the strongest received signal strength, with regard to signals transmitted from the EP IoT device, e.g., based on received signals at the GWs, data measurements at the GWs, and metadata from gateways, said data from the GWs being forwarded to the control server, e.g., via a network server, which aggregates information from a plurality of gateways.

Operation proceeds from step 1212 to step 1218. In step 1218 the control server generates an association response message. Step 1218 includes step 1220, step 1222 and, in some embodiments, step 1224. In step 1220 the control server includes an acknowledgment, indicating that the association request is granted, in the association response message. In step 1222 the control server includes information, e.g. an E2E path identifier, identifying the E2E communications path, in the association response message. In step 1224 the control server includes information, e.g. a gateway (GW) identifier, identifying the gateway selected by the control serve to be used for the E2E communications path, in the association response message. Operation proceeds from step 1218 to step 1226.

In step 1226 the control server sends the generated association response message to the EP IoT device. Step 1226 includes step 1228, 1230, and, in some embodiments, step 1232. In step 1228 the control server sends an acknowledgement indicating that the association request is granted, and the EP IoT device has been associated with a particular GW, which is the selected GW. In step 1230 the control server sends information, e.g. a E2E path identifier, identifying the E2E communications path. In step 1232 the control server sends information, e.g. a GW identifier, identifying the gateway selected by the control server to be used for the E2E communications path, said selected gateway being associated with the EP IoT device. Operation proceeds from step 1226, via connecting node A 1234, to step 1236.

In step 1236 the control server performs operation to transmission power control (TPC) the EP IoT device for associated mode operation. Step 1236 includes steps 1238, 1240, 1242, 1244, 1246, 1248, 1250, 1252, 1254 1256 and 1258. In step 1238 the control server sends a command to the EP IoT device to set the EP IoT device at maximum transmit power level and maximum data rate. Operation proceeds from step 1238 to step 1240. In step 1240 the control server sends a command to the EP IoT device to transmit a frame of training data. Operation proceeds from step 1240 to step 1242. In step 1242 the control server monitors for and/or receives data, e.g., aggregated data, corresponding to one or more gateways via which the frame of training data was received. Operation proceeds from step 1242 to step 1244.

In step 1244 the control server determines if the training data was successfully received by the selected gateway. If the training data was successfully received by the selected gateway, then operation proceeds from step 1244 to step 1250. However, if the training data was not received by the selected gateway, then operation proceeds from step 1244 to step 1246.

In step 1250 the control server determines if the training data was successfully received by any additional gateways in addition to the selected gateway. If the training data was successfully received by one or more additional gateways in addition to the selected gateway, then operation proceeds from step 1250 to step 1254; otherwise, operation proceeds from step 1250 to step 1258. In step 1254 the control server sends a command to the EP IoT device to reduce the transmit power level, e.g., by 1.5 dB, at the EP IoT device. Operation proceeds from step 1254 to step 1240, in which the control server sends a command to the EP IoT device to transmit another frame of training data.

Returning to step 1258, in step 1258 the control server sends a command to the EP IoT device to inform the EP IoT device that TPC training is ended and the current transmit power level is the power level to be used for associated mode data transmissions.

Returning to step 1246, in step 1246 if the evaluation is of the initial training frame, then operation proceeds from sep 1246, to step 1248, in which the control server determines that the selected gateway, which has been associated (paired) with the EP IoT device, is currently unacceptable, and a different gateway needs to be selected and the transmission power control training needs to be restarted. However, if the evaluation of step 1244 was not of the initial training frame, then operation proceeds from step 1246, to step 1252, in which the control server sends a command to the EP IoT device to increase the transmit power level at the EP IoT device to the power level used for the last successful training reception with respect to the selected gateway. Operation proceeds from step 1252 to step 1256. In step 1256 the control server sends a command to the EP IoT device to information the EP IoT device that the TPC training is ended and the current transmission power level is the power level to be used for associated mode data transmissions.

Operation proceeds from step 1236 to step 1260, in which the control server receives forwarded EP IoT application data.

In some embodiments, the forwarded EP IoT application data may, and sometimes does, include aggregated forwarded EP IoT application data, e.g. forwarded from the selected GW and another gateway, e.g., based on a changed location of the EP IoT device since TPC training, a change in channel conditions since TPC training, or the inability of TPC training to limit wireless communications to just the selected gateway, e.g. due to the EP IoT device being equidistance between two GWs.

Operation proceeds from step 1260 to step 1262. In step 1262 the control server filters out any received EP IoT application data which was not communicated via the E2P communications path including the selected gateway, which is associated with (or paired to) the EP IoT. In some embodiments, the filtering is based on inclusion of a path identifier. In some embodiments, the filtering is based on a GW identifier corresponding to the selected GW associated with the EP IoT device. In some embodiments, the filtering is performed by a network server preceding the control server, which receives and aggregates information from GWs.

Steps 1260 and 1262 are performed repetitively, e.g., as additional data reports, e.g., sensor reports are sent by the EP IoT device.

Operation proceeds from step 1262, via connecting node B 1264 to step 1266. In step 1266. The control server is operated to determine if the EP IoT device should exit from associated mode. Step 1266 includes steps 1268, 1270 and 1272.

In step 1268 the control server checks and determines whether or not the control server has received an associated exit request from the EP IoT device. If the determination is that the EP IoT device has not received an associated exit request from the EP IoT device, then operation proceeds from the output of step 1268 to the input of step 1268 and another check is made at a later point in time, e.g., after a predetermined time interval. However, if the determination is that the EP IoT device has received an associated exit request from the EP IoT device, then operation proceeds from step 1268 to step 1272 in which the control server determines that associated mode with regard to the EP IoT device should be ended.

In step 1270 the control server determines if the control server has determined that continual use of the selected GW for the E2E path is undesirable, e.g. reception quality has degraded since the EP IoT device has moved since the association determination and TPC. If the determination is that continual use of the selected GW is acceptable, then operation proceeds from the output of step 1270 to the input of step 1270 and another check is made at a later point in time, e.g., after a predetermined time interval. However, if the determination is that the continual use of the selected GW is undesirable, then operation proceeds from step 1270 to step 1272 in which the control server determines that associated mode with regard to the EP IoT device should be ended. Operation proceeds from step 1272 to step 1274.

In step 1274 the control server sends a message to the EP IoT device to terminate associated mode and cause the EP IoT device to transition to non-associated mode. Each iteration of step 1274 includes one of step 1276 or step 1278. In step 1276 the control server sends an acknowledgment in response to the received association exit request. In step 1274 the control server sends an association exit request to the EP IoT device. Operation proceeds from step 1274, via connecting node C 1280, to step 1282.

In step 1282 the control server performs operation to transmission power control (TPC) the EP IoT device for non-associated mode operation. Step 1282 includes steps 1284, 1286, 1288, 1290, 1292, 1294, 1296, 1298, 1300, 1302 and 1304. In step 1284 the control server sends a command to the EP IoT device to set the EP IoT device at maximum transmit power level and maximum data rate. Operation proceeds from step 1284 to step 1286. In step 1286 the control server sends a command to the EP IoT device to transmit a frame of training data. Operation proceeds from step 1286 to step 1288. In step 1288 the control server monitors for and/or receives data, e.g., aggregated data, corresponding to one or more gateways via which the frame of training data was received. Operation proceeds from step 1288 to step 1290.

In step 1290 the control server determines if the training data was successfully received by at least one gateway. If the training data was successfully received by at least one gateway, then operation proceeds from step 1290 to step 1294. However, if the training data was not received by at least one gateway, then operation proceeds from step 1290 to step 1292.

In step 1294 the control server determines if the training data was successfully received by more than one gateway. If the training data was successfully received by more than one gateway, then operation proceeds from step 1294 to step 1300; otherwise, operation proceeds from step 1294 to step 1304. In step 1300 the control server sends a command to the EP IoT device to reduce the transmit power level, e.g., by 1.5 dB, at the EP IoT device. Operation proceeds from step 1300 to step 1286, in which the control server sends a command to the EP IoT device to transmit another frame of training data.

Returning to step 1304, in step 1304 the control server sends a command to the EP IoT device to inform the EP IoT device that TPC training is ended and the current transmit power level is the power level to be used for non-associated mode data transmissions.

Returning to step 1292, in step 1292 if the evaluation is of the initial training frame, then operation proceeds from step 1292, to step 1296, in which the control server determines that the EP IoT device, is currently inaccessible and TPC training will be restarted at later point in time, e.g. following a predetermined delay interval. However, if the evaluation of step 1290 was not of the initial training frame, then operation proceeds from step 1292, to step 1298, in which the control server sends a command to the EP IoT device to increase the transmit power level at the EP IoT device to the power level used for the last successful training data reception. Operation proceeds from step 1298 to step 1302. In step 1302 the control server sends a command to the EP IoT device to inform the EP IoT device that the TPC training is ended and the current transmission power level is the power level to be used for non-associated mode data transmissions.

Operation proceeds from step 1282 to step 1306, in which the control server receives forwarded EP IoT application data. In some embodiments, the forwarded EP IoT application data may, and sometimes does, include aggregated forwarded EP IoT application data, e.g. forwarded from the a plurality of GWs, e.g., based on a changed location of the EP IoT device since TPC training, a change in channel conditions since TPC training, or the inability of TPC training to limit wireless communications to just the selected gateway, e.g. due to the EP IoT device being equidistance between two GWs.

Steps 1306 is performed repetitively, e.g., as additional data reports, e.g., sensor reports are sent by the EP IoT device. Operation proceeds from step 1306, via connecting node D 1308 to step 1202, in which the control server monitors for another association request from the EP IoT device.

Flowchart 1200 of FIG. 6 has been described from the perspective of controlling a single EP IoT device. It should be appreciated the control server is operated to control multiple EP IoT devices in the communications system. Thus, the steps of flowchart 1200 may be, and sometimes are performed by the control server for each of a plurality of different EP IoTs devices in the communications system. Thus each EP IoT device in the system may be, and sometimes is, associated with (paired with) one of the GWs in the system. In addition each EP IoT device in the system may be, and sometimes is, individually transmission power controlled (TPC) by the control server.

Figure 7:
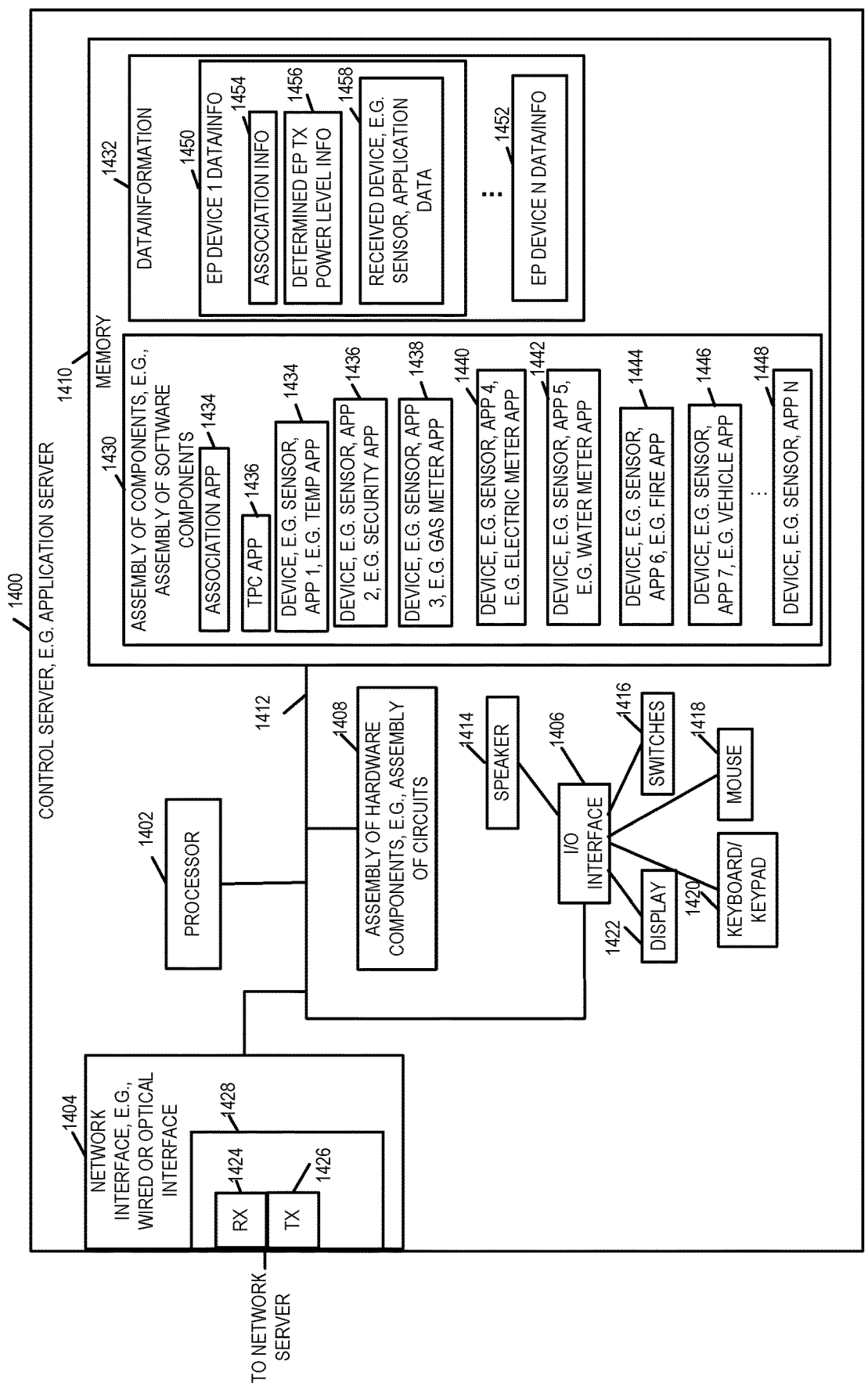
FIG. 7 is a drawing of an exemplary control server, e.g., an application server, in accordance with an exemplary embodiment.

FIG. 7 is a drawing of an exemplary control server 1400, e.g., an application server, in accordance with an exemplary embodiment. Exemplary control server 1400 is, e.g. exemplary control server 218, e.g., an application server, of FIGS. 2, 3, 4, and 5, and/or a control server, e.g. an application server, described with respect to the flowchart of FIG. 6. Exemplary control server 1400 includes a processor 1402, e.g., a CPU, a network interface 1404, e.g., a wired or optical interface, an I/O interface 1406, an assembly of hardware components 1408, e.g., an assembly of circuits, and memory 1410 coupled together via a bus 1412 over which the various elements may interchange data and information. Network interface 1404 includes a receiver 1424 and a transmitter 1426. In some embodiments, receiver 1424 and transmitter 1426 are included as part of a transceiver 1428. Network interface 1404 couples the control server, e.g. an application server, to a network server, e.g., network server 216.

Control server 1400 further includes a plurality of input/output devices (speaker 1414, switches 1416, mouse 1418, keyboard/keypad 1420 and display 1422, which are coupled to I/O interface 1406 allowing the various I/O devices to communicate with other elements coupled to bus 1412.

Memory 1410 includes an assembly of components 1430, e.g., an assembly of software components 1430 and data/information 1432. Assembly of components 1430 includes an association app 1434 for performing operations and control related to associating an EP device with a particular GW and a communications path, a transmit power control (TPC) app 1436 for performing operations and control related to TPC controlling an EP device and/or a GW device, and a plurality of device, e.g. sensor, applications, e.g., corresponding to different functions and/or services (device, e.g., sensor, app 1 1434, e.g., a temperature app, device, e.g., sensor, app 2 1436, e.g., a security app, device, e.g., sensor, app 3 1438, e.g., a gas meter app, device, e.g., sensor, app 4 1440, e.g., an eclectic meter app, device, e.g., sensor, app 5 1442, e.g., a water meter app, device, e.g., sensor, app 6 1444, e.g., a fire detection and/or notification app, device, e.g., sensor, app 7 1434, e.g., a vehicle app such as a vehicle tracking app or vehicle status reporting app, . . . , a device, e.g., sensor, app N). Data information 1432 includes information corresponding to a plurality of end point (EP) devices (EP device 1, e.g. EP IoT device 1, data information 1450, . . . EP device N data/information 1452). EP device 1 data/information 1450 includes association information, e.g. information associating EP device 1 with a particular selected or determined GW and an E2E communications path between EP device 1 and the control server 1410, determined EP TX power level information 1456, e.g., a determined TX power level to be used by EP device 1 following TPC training operations under the control of control server 1400, an a received device, e.g. sensor, application data 1458, e.g., a received sensor report from EP device 1.

Figure 8:
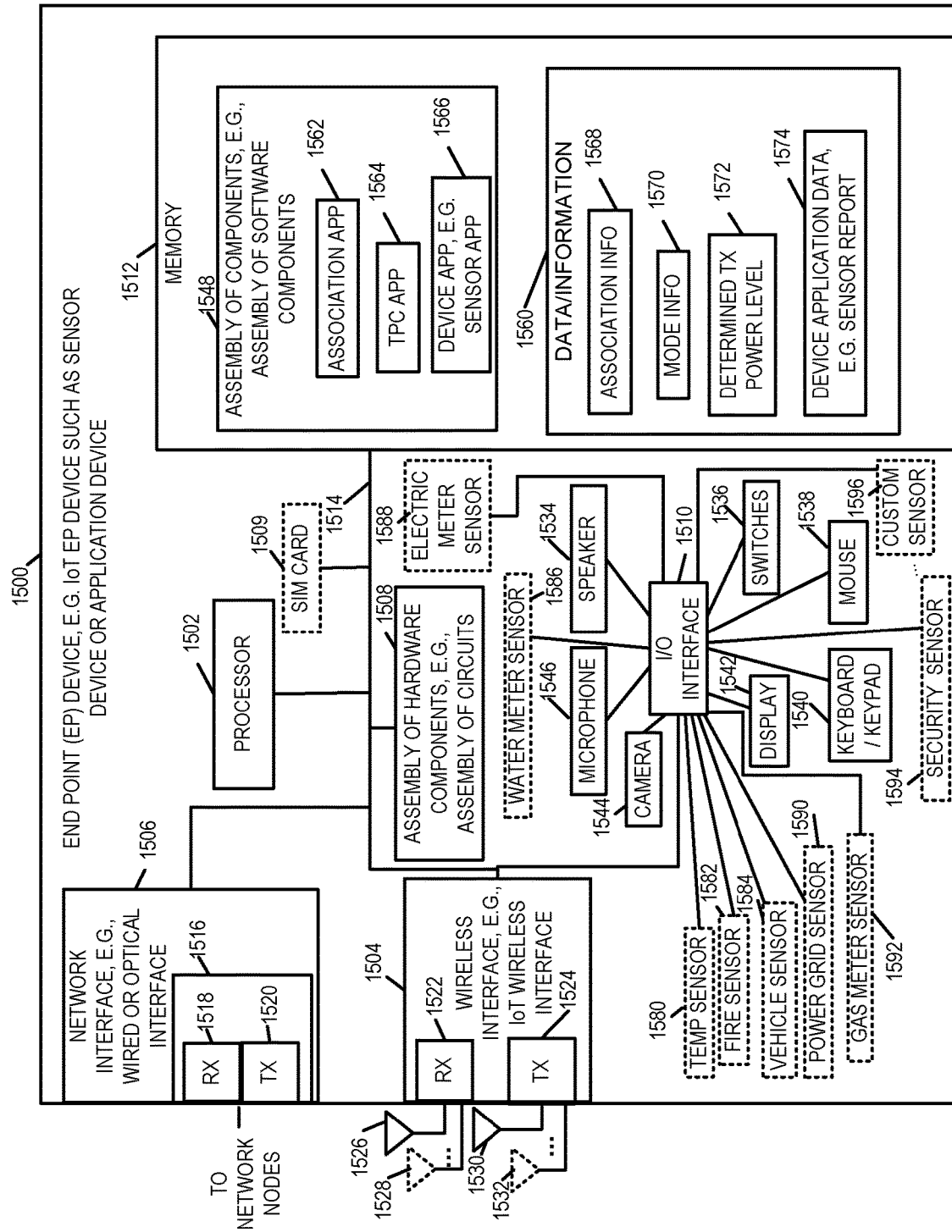
FIG. 8 is a drawing of an exemplary end point (EP) device, e.g., an EP IoT device, in accordance with an exemplary embodiment.

FIG. 8 is a drawing of an exemplary end point (EP) device 1500, e.g., an EP IoT device, e.g., an EP IoT sensor device, in accordance with an exemplary embodiment. Exemplary EP device 1500 is, e.g., any of the EP devices (220, 222, 224, 226, 228, 230, 232, . . . , 234) of FIG. 2, EP device 302 of FIGS. 3, 4, and 5, and/or an EP device described with respect to the flowchart of FIG. 6. Exemplary EP device 1500 includes a processor 1502, e.g., a CPU, a wireless interface 1504, e.g., an IoT wireless interface, a network interface 1506, e.g., a wired or optical interface, an I/O interface 1510, an assembly of hardware components 1508, e.g., an assembly of circuits, memory 1512, and in some embodiments, SIM card 1509, coupled together via a bus 1514 over which the various elements may interchange data and information. Wireless interface 1504 includes a wireless receiver 1522 coupled to one or more receive antennas 1526, . . . , 1528, and a wireless transmitter 1524 coupled to one or more transmit antennas 1530, . . . , 1532. In some embodiments, the same antenna(s) are used for transmit and receive. Network interface 1504 includes a receiver 1518 and a transmitter 1520. In some embodiments, receiver 1518 and transmitter 1520 are included as part of a transceiver 1516.

End point (EP) device 1500 further includes a plurality of input/output devices (speaker 1534, switches 1536, mouse 1538, keyboard/keypad 1540, display 1532, camera 1544, microphone 1546, and one or more of: temperature sensor 1580, fire sensor 1582, vehicle sensor 1584, water meter sensor 1586, electric meter sensor 1588, power line sensor 1590, gas meter sensor 1592, security sensor 1594, . . . , custom sensor 1596) which are coupled to I/O interface 1510 allowing the various I/O devices to communicate with other elements coupled to bus 1514.

Memory 1510 includes an assembly of components 1548, e.g., an assembly of software components and data/information 1560. Assembly of components 1548 includes an association app 1562 for performing operations and related to associating the EP device with a single GW and a communications path between the EP device and a control server, e.g. an application server, a transmit power control (TPC) app 1564 for performing operations related to EP device TX power control under the direction of a control server, e.g., to determine a TX power level to use, and a device app 1566, e.g., a sensor app corresponding to the function and/or type of data to be reported by the EP device to the control server, e.g. an application server. Data/information 1560 includes association information 1568, e.g., information identifying a particular GW which has been associated with the EP device and/or information identifying an E2E communication path between the EP device and the control server, e.g., an application server, mode information 1570, e.g., information identifying whether the EP device is currently in associated mode or non-associated mode, a determined TX power level 1572 to be used by the EP device, and device application data 1574, e.g., a sensor report, to be sent to the application server.

Figure 9:
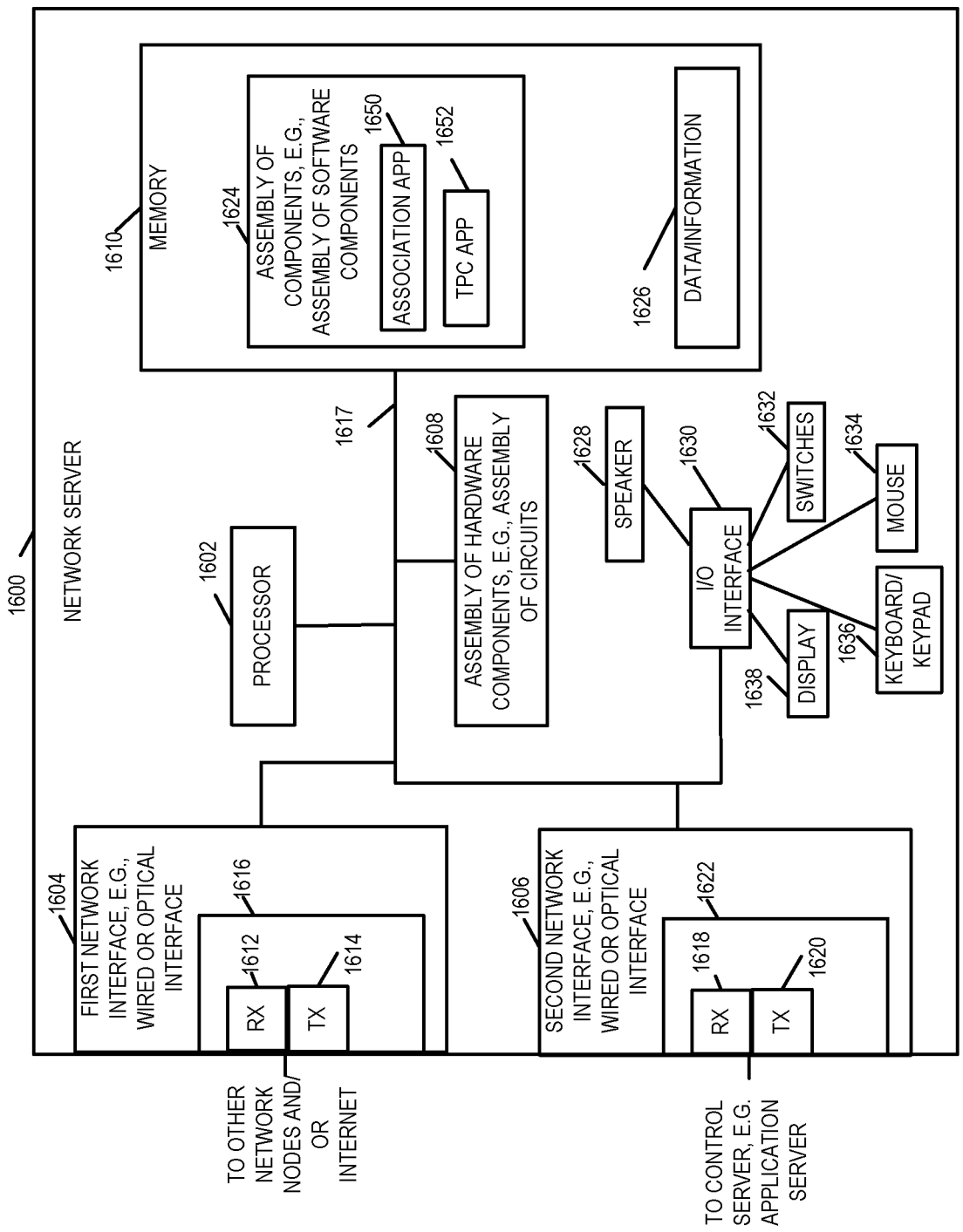
FIG. 9 is a drawing of an exemplary network server in accordance with an exemplary embodiment.

FIG. 9 is a drawing of an exemplary network server 1600 in accordance with an exemplary embodiment. Exemplary network server 1600 is, e.g., network server 216 of FIGS. 2, 3, 4, and 5 and/or a network server described with respect to flowchart of FIG. 6. Exemplary network server 1600 includes a processor 1602, e.g., a CPU, a first network interface 1604, e.g., a wired or optical interface, a second network interface 1606, an I/O interface 1630, an assembly of hardware components 1608, e.g., an assembly of circuits, and memory 1610 coupled together via a bus 1617 over which the various elements may interchange data and information. First network interface 1604 includes a receiver 1612 and a transmitter 1614. In some embodiments, receiver 1612 and transmitter 1614 are included as part of a transceiver 1616. First network interface 1604 couples the network server, e.g. to other network nodes and/or the Internet. Second network interface 1606 includes a receiver 1618 and a transmitter 1620. In some embodiments, receiver 1618 and transmitter 1620 are included as part of a transceiver 1622. Second network interface 1606 couples the network server, e.g. to a control server, e.g. an application server such as AS 218. In some embodiments, there is a single network interface which performs the functionality of both first and second network interfaces 1604, 1606.

Network server 1600 further includes a plurality of input/output devices (speaker 1628, switches 1632, mouse 1634, keyboard/keypad 1636 and display 1638, which are coupled to I/O interface 1630 allowing the various I/O devices to communicate with other elements coupled to bus 1617.

Memory 1610 includes an assembly of components 1624, e.g., an assembly of software components, and data/information 1626. Assembly of components 1624 includes an association app 1650 for performing operations and control related to associating an EP device with a particular GW and a communications path, a transmit power control (TPC) app 1652 for performing operations and control related to TPC controlling an EP device and/or a GW device. Operation performed by network device 1600 include aggregation related to messages received from one or more gateways and communication of data/information received from gateways including aggregated information to a control server, e.g. an application server. The network device 1600 also receives messages from the control server, e.g. application server, instructing the network server to send messages, e.g. including commands such as power control commands to an EP device and/or a GW.

Figure 10:
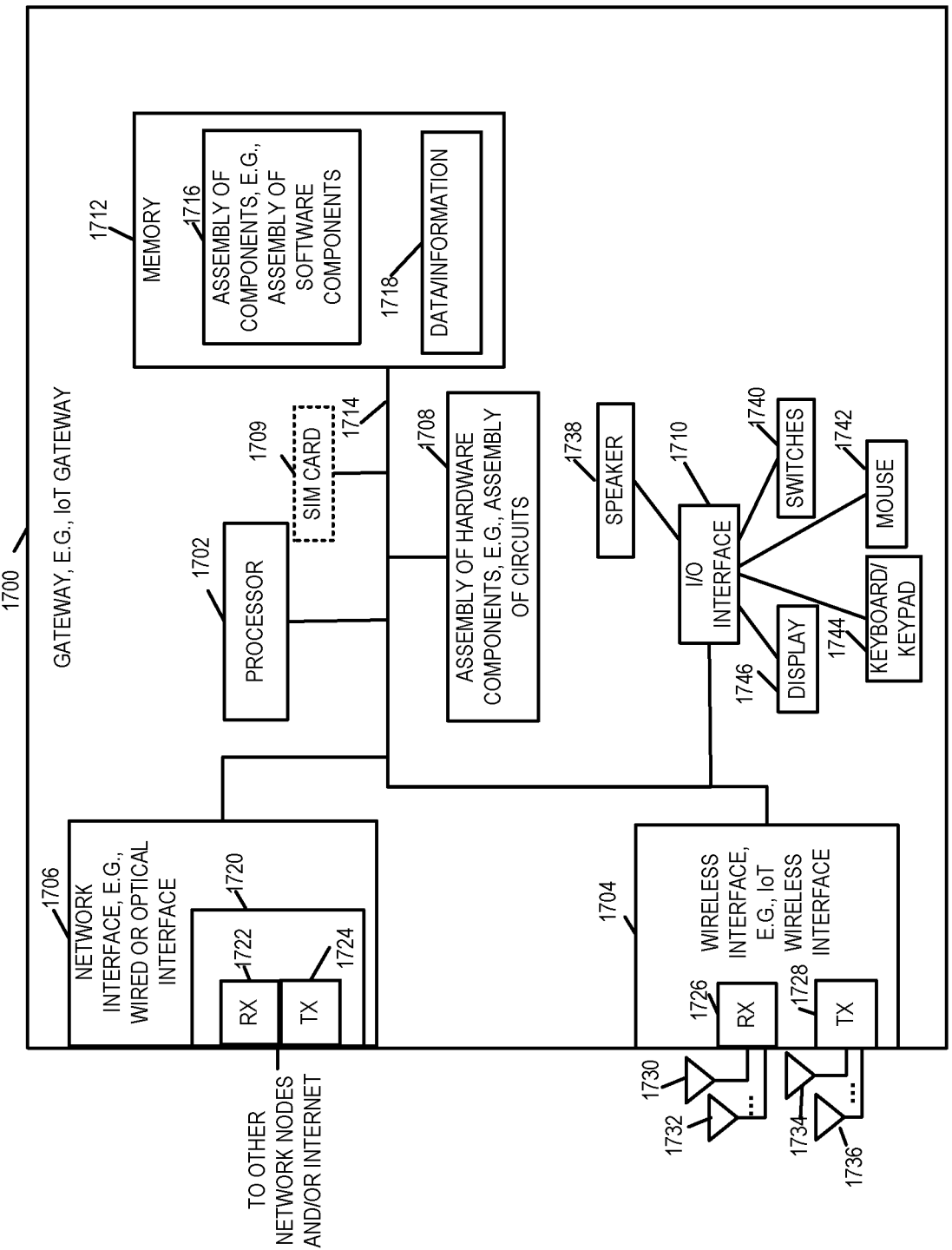
FIG. 10 is a drawing of an exemplary gateway, e.g., an IoT gateway, in accordance with an exemplary embodiment.

FIG. 10 is a drawing of an exemplary gateway (GW) 1700, e.g., an IoT gateway, in accordance with an exemplary embodiment. Exemplary gateway 1700 is, e.g., one of the gateways (202, . . . , 204) of FIGS. 2, 3, 4 and 5 and/or a GW described with respect to the flowchart of FIG. 6. Exemplary gateway 1700 includes a processor 1702, e.g., a CPU, a wireless interface 1704, a network interface 1706, e.g., a wired or optical interface, an I/O interface 1710, an assembly of hardware components 1708, e.g., an assembly of circuits, a memory 1710, and in some embodiments, a SIM card 1709, coupled together via a bus 1714 over which the various elements may interchange data and information. Wireless interface 1704, e.g., an IoT wireless interface, includes a wireless receiver 1726 coupled to one or more receive antennas 1730, . . . 1732, via which the gateway receives wireless signals, e.g. IoT broadcast signals from EP devices, e.g. EP IoT devices, and a wireless transmitter 1728 coupled to one or more transmit antennas 1734, . . . 1736, via which the gateway transmits wireless signals, e.g. IoT downlink signals, to EP devices, e.g. EP IoT devices. In some embodiments, the same antenna(s) are used for both transmit and receive. Network interface 1706 includes a receiver 1722 and a transmitter 1724. In some embodiments, receiver 1722 and transmitter 1724 are included as part of a transceiver 1720. Network interface 1706 couples the gateway 1700, e.g. to other network nodes and/or the Internet.

Gateway 1700 further includes a plurality of input/output devices (speaker 1738, switches 1740, mouse 1742, keyboard/keypad 1744 and display 1746, which are coupled to I/O interface 1710 allowing the various I/O devices to communicate with other elements coupled to bus 1714.

Memory 1712 includes an assembly of components 1716, e.g., an assembly of software components, and data/information 1718.

Figure 11A:
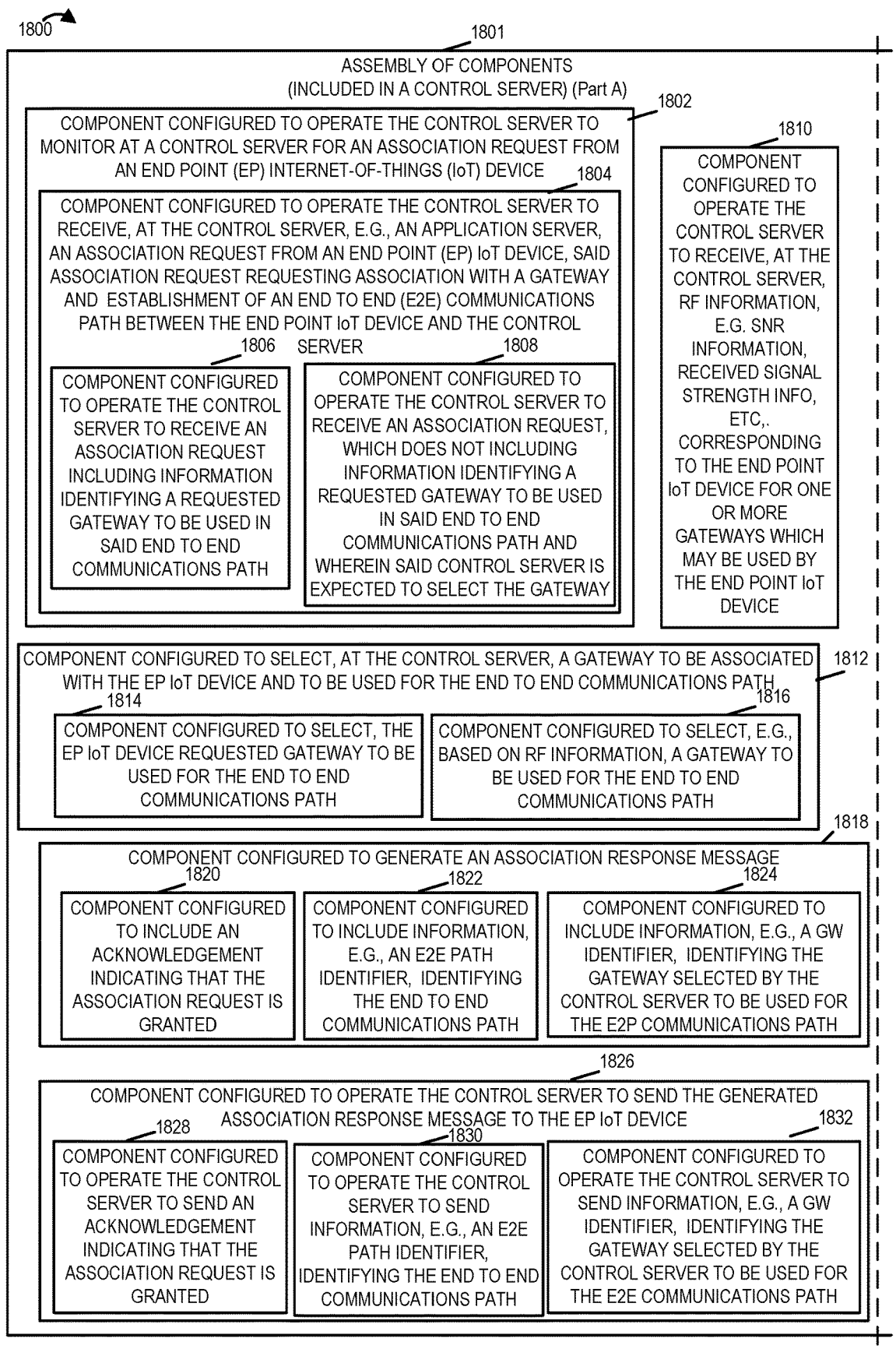
FIG. 11A is a first part of a drawing of an exemplary assembly of components, which may be included in an exemplary control server, e.g. an application server, in accordance with an exemplary embodiment.
Figure 11B:
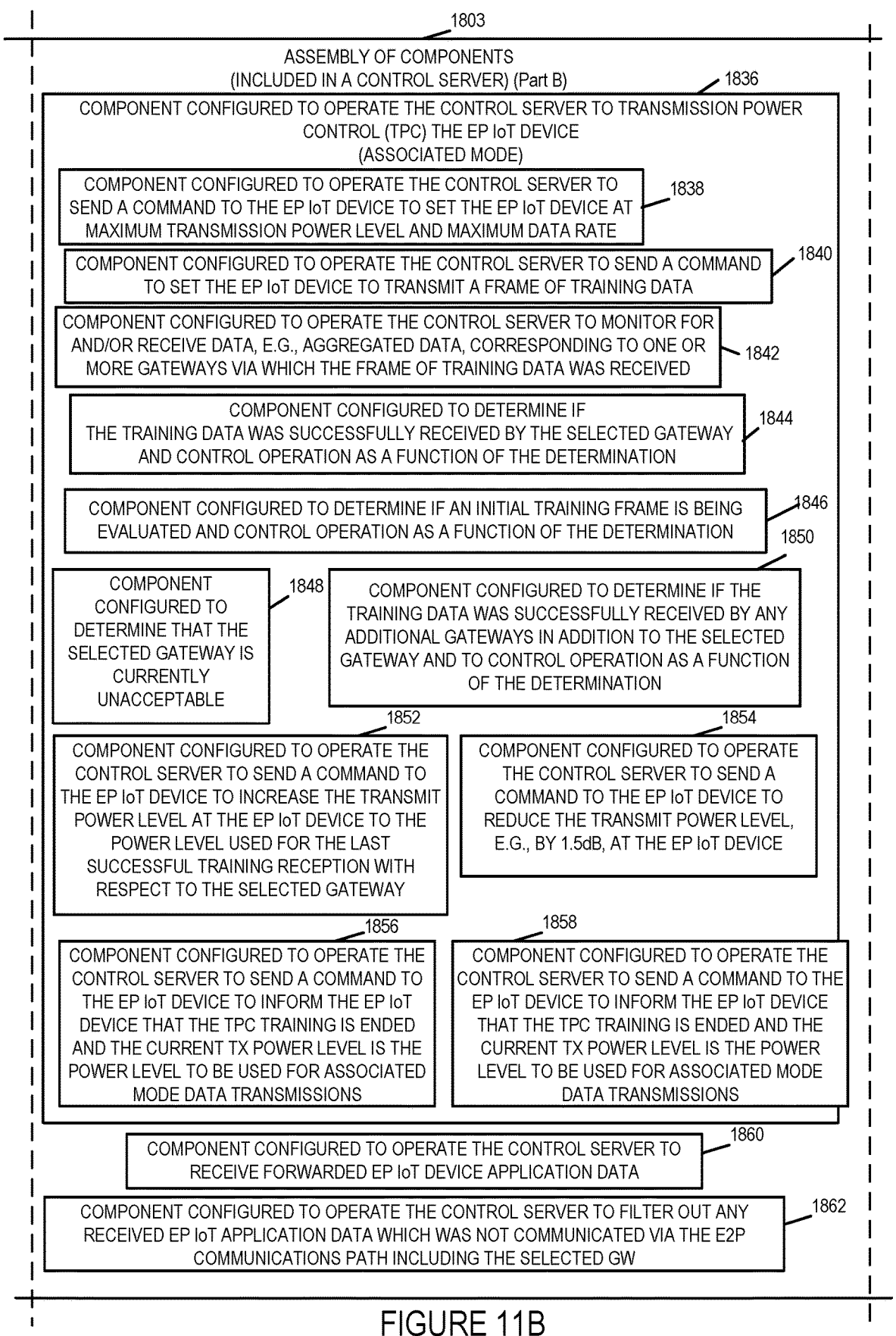
FIG. 11B is a second part of a drawing of an exemplary assembly of components, which may be included in an exemplary control server, e.g. an application server, in accordance with an exemplary embodiment.
Figure 11C:
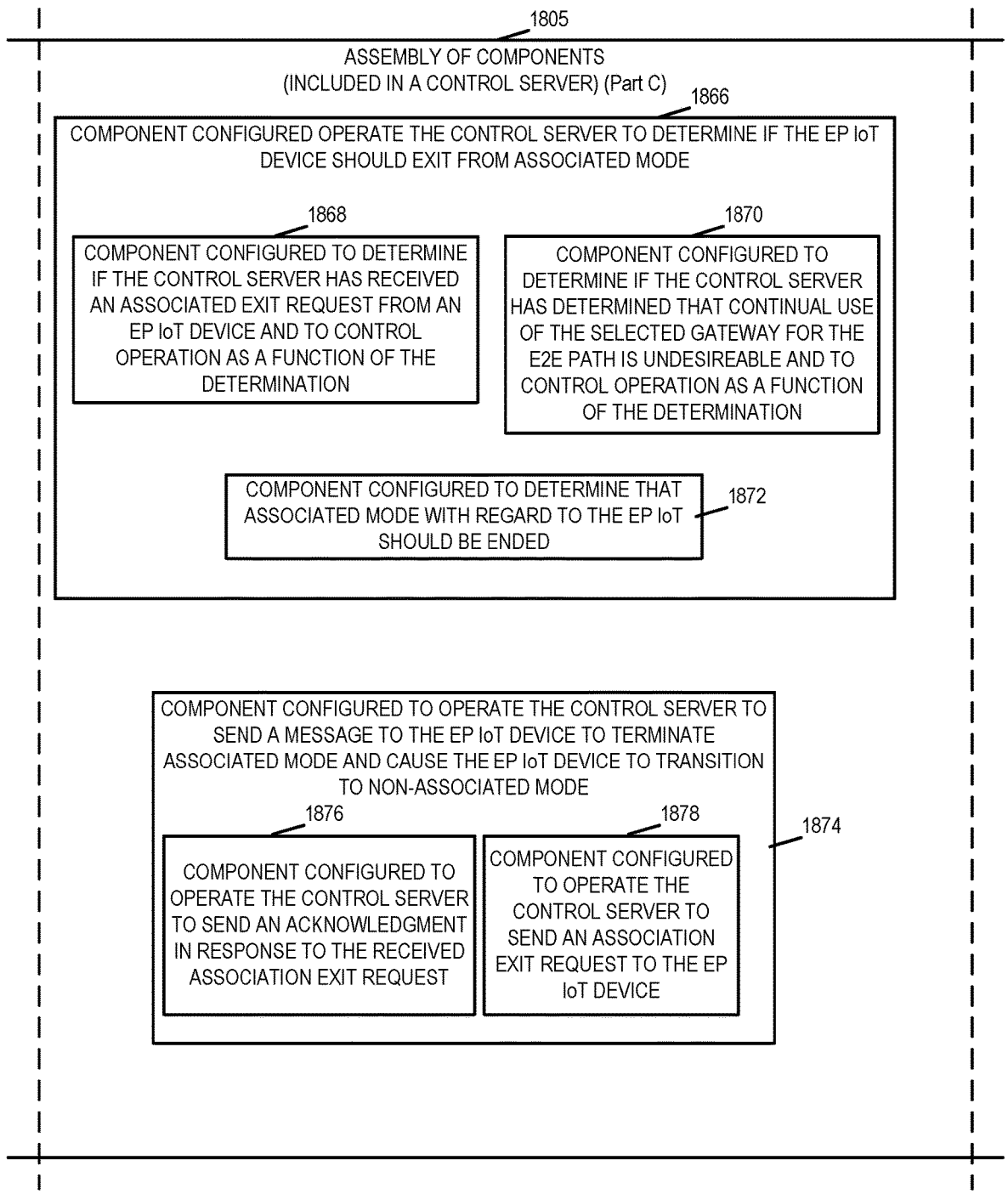
FIG. 11C is a third part of a drawing of an exemplary assembly of components, which may be included in an exemplary control server, e.g. an application server, in accordance with an exemplary embodiment.
Figures 11, 11D:
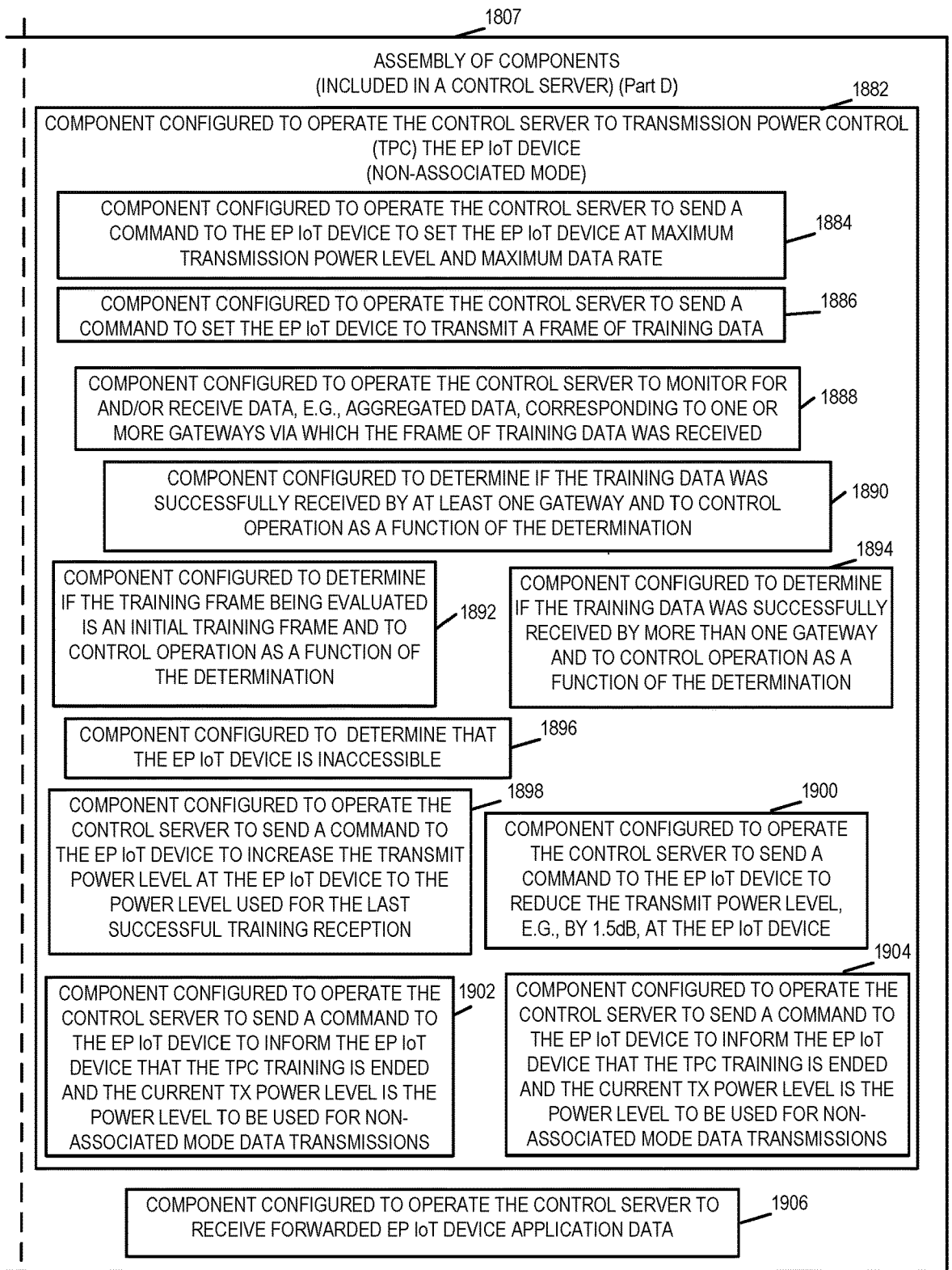
FIG. 11D is a fourth part of a drawing of an exemplary assembly of components, which may be included in an exemplary control server, e.g. an application server, in accordance with an exemplary embodiment.
FIG. 11 comprises the combination of FIG. 11A, FIG. 11B, FIG. 11C and FIG. 11D.

FIG. 11, comprising the combination of FIG. 11A, FIG. 11B, FIG. 11C and FIG. 11D is a drawing of an exemplary assembly of components 1800, comprising the combination of Part A 1801, Part B 1803, Part C 1805 and Part D 1807, which may be included in an exemplary control server, e.g. an application server, in accordance with an exemplary embodiment. Exemplary assembly of components is, e.g. included in control server 1400, e.g., an application server, of FIG. 7, exemplary control server 218, e.g., an application server, of FIGS. 2, 3, 4, and 5, and/or a control server, e.g. an application server, described with respect to the flowchart of FIG. 6.

The components in the assembly of components 1800 can, and in some embodiments are, implemented fully in hardware within a processor, e.g., processor 1402, e.g., as individual circuits. The components in the assembly of components 1800 can, and in some embodiments are, implemented fully in hardware within the assembly of hardware components 1408, e.g., as individual circuits corresponding to the different components. In other embodiments some of the components are implemented, e.g., as circuits, within processor 1402 with other components being implemented, e.g., as circuits within assembly of components 1408, external to and coupled to the processor 1402. As should be appreciated the level of integration of components on the processor and/or with some components being external to the processor may be one of design choice. Alternatively, rather than being implemented as circuits, all or some of the components may be implemented in software and stored in the memory 1410 of the control server 1400, with the components controlling operation of control server 1400 to implement the functions corresponding to the components when the components are executed by a processor e.g., processor 1402. In some such embodiments, the assembly of components 1800 is included in the memory 1410 as part of assembly of software components 1430. In still other embodiments, various components in assembly of components 1800 are implemented as a combination of hardware and software, e.g., with another circuit external to the processor providing input to the processor which then under software control operates to perform a portion of a component's function.

When implemented in software the components include code, which when executed by a processor, e.g., processor 1402, configure the processor to implement the function corresponding to the component. In embodiments where the assembly of components 1800 is stored in the memory 1410, the memory 1410 is a computer program product comprising a computer readable medium comprising code, e.g., individual code for each component, for causing at least one computer, e.g., processor 1402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the control server 1400 or elements therein such as the processor 1402, to perform the functions of corresponding steps illustrated and/or described in the method of one or more of the flowcharts, signaling diagrams and/or described with respect to any of the Figures. Thus the assembly of components 1800 includes various components that perform functions of corresponding one or more described and/or illustrated steps of an exemplary method.

Assembly of components 1800 includes a component 1802 configured to operate the control server to monitor at the control server for an association request from and end point (EP) Internet of Things (IoT) device. Component 1802 includes a component 1804 configured to operate the control server to receive, at the control server, an association request requesting association with a gateway and establishment of an end to end (E2E) communications path between the end point IoT device and the control server. Component 1804 includes a component 1806 configured to operate the control server to receive an association request including information identifying a requested gateway to be used in said end to end communications path and a component 1808 configured to operate the control server to receive an association request, which does not include information identifying a requested gateway to be used in said end to end communications path and wherein said control server is expected to select the gateway.

Assembly of components 1800 further includes a component 1810 configured to operate the control server to receive, at the control serve, radio frequency (RF) information, e.g. SNR information, received signal strength information, etc., corresponding to the end point IoT device for one or more gateways which may be used by the end point IoT device, and component 1812 configured to select, at the control server, a gateway to be associated with the EP IoT device and to be used for the end to end communications path. Component 1812 includes a component 1814 configured to select, the EP IoT requested gateway to be used for the end to end communications path, and a component 1816 configured to select, e.g. based on RF information, a gateway to be used for the end to end communications path.

Assembly of components 1800 further includes a component 1818 configured to generate an association response message. Component 1818 includes a component 1820 configured to include an acknowledgment indicating that the association request is granted, a component 1822 configured to include information, e.g., an end to end (E2E) path identifier, identifying the E2E path, and a component 1824 configured to include information, e.g., a gateway identifier, identifying the gateway selected by the control server to be used for the E2E communications path.

Assembly of components 1800 further includes a component 1826 configured to operate the control server to send the generated association request response message to the EP IoT device. Component 1826 includes a component 1828 configured to operate the control server to send an acknowledgment indicating that the association request is granted, a component 1830 configured to operate the control server to send information, e.g. an E2E path identifier, identifying the end to end communications path and a component 1832 configured to operate the control server to send information, e.g., a GW identifier, identifying the gateway selected by the control server to be used for the E2E communications path.

Assembly of component 1800 further includes a component 1836 configured to operate the control server to transmission power control (TPC) the EP IoT device for associated mode. Component 1836 includes a component 1838 configured to operate the control server to send a command to the EP IoT device to set the EP IoT device at maximum transmission power level and maximum data rate, a component 1840 configured to operate the control server to send a command to set the EP IoT device to transmit a frame of training data, a component 1842 configured to operate the control server to monitor for and/or receive data, e.g., aggregated data, corresponding to one or more gateways via which the frame of training data was received, a component 1844 configured to determine if the training data was successfully received by the selected gateway and to control operation as a function of the determination, a component 1846 configured to determine if successful reception of an initial training frame is being evaluated and control operation as a function of the determination, a component 1848 configured to determine that the selected gateway is currently unacceptable, e.g., in response to a determination that that reception of the initial training frame is being evaluated and that the selected gateway failed to successfully receive the data, and a component 1852 configured to operate the control server to increase the transmit power level at the EP IoT device to the power level used for the last successful training reception with respect to the selected gateway, e.g. in response to a determination that the training data was not successfully received by the selected gateway and that this was not the initial training frame. Component 1836 further includes a component 1850 configured to determine if the training frame was received by any additional gateways in addition to the selected gateway and to control operation as a function of the determination, and a component 1854 configured to operate the control server to send a command to the EP IoT device to reduce the transmit power level, e.g., by 1.5 dB, at the EP IoT device, e.g., in response to a determination that one or more additional gateways received the training data in addition to the selected gateway.

Component 1836 further includes a component 1856 configured to operate the control server to send a command to the EP IoT device to inform the EP IoT device that the TPC training is ended and the current TX power level is the power level to be used for associated mode data transmissions, e.g., following component 1852 sending a command to the EP IoT device, and a component 1858 configured to operate the control server to send a command to the EP IoT device to inform the EP IoT device that the TPC training is ended and the current power level is the power level to be used for associated mode data transmissions, e.g., in response to a determination the training data was successfully received by the selected gateway but was not successfully received by an additional gateways.

Assembly of components 1800 further includes a component 1860 configured to operate the control server to received forwarded EP IoT device application data, and a component 1862 configured to operate the control server to filter out any received EP IoT application data which was not communicated via the E2E communications path including the selected gateway. Assembly of component 1800 further includes a component 1866 configured to operate the control server to determine if the EP IoT device should exit from associated mode. Component 1866 includes a component 1868 configured to determine if the control server has received an associated exit request from an EP IoT device and control operation as a function of the determination, a component 1870 configured to determine if the control server has determined that continual use of the selected gateway for the E2E path is undesirable and to control operation as a function of the determination, and a component 1872 configured to determine that associated mode with regard to the EP IoT device should be ended, e.g., in response to either of: i) a received associated exit request from the EP IoT device or ii) a control server determination that continued use of the selected gateway for the E2E path is undesirable, e.g., based on a change, e.g., degradation, in RF reported information, e.g., SNR and/or signal strength, corresponding to the EP IoT device and the selected gateway, based on changes in network loading among GW, and/or based on an observed decrease in successful recovery of information from the EP IoT. Assembly of components 1800 further includes a component 1874 configured to operate the control serve to send a message to the EP IoT device to terminate associated mode and cause the EP IoT device to transition into non-associated mode, e.g. in response to a determination that associated mode with regard to the EP IoT device should be ended. Component 1874 includes a component 1876 configured to operate the control server to send an acknowledgment in response to the received association exit request, and a component 1878 configured to operate the control server to send an association exit request to the EP IoT device, e.g., in response to a determination by the control server that continued use of the selected gateway is undesirable and that the control server has determined that associated mode should be ended.

Assembly of component 1800 further includes a component 1882 configured to operate the control server to transmission power control (TPC) the EP IoT device for non-associated mode. Component 1882 includes a component 1884 configured to operate the control server to send a command to the EP IoT device to set the EP IoT device at maximum transmission power level and maximum data rate, a component 1886 configured to operate the control server to send a command to set the EP IoT device to transmit a frame of training data, a component 1888 configured to operate the control server to monitor for and/or receive data, e.g., aggregated data, corresponding to one or more gateways via which the frame of training data was received, a component 1890 configured to determine if the training data was successfully received by the at least one gateway and to control operation as a function of the determination, a component 1892 configured to determine if reception of an initial training frame is being evaluated and control operation as a function of the determination, a component 1896 configured to determine that the EP IoT device is currently inaccessible, e.g., in response to a determination that that reception of the initial training frame was evaluated and that the initial training frame data was not successfully received by any of the gateways, and a component 1898 configured to operate the control server to increase the transmit power level at the EP IoT device to the power level used for the last successful training reception, e.g. in response to a determination that the training data was not successfully received by any gateways and that this was not the initial training frame.

Component 1882 further includes a component 1894 configured to determine if the training frame was received by more than one gateway and to control operation as a function of the determination, and a component 1900 configured to operate the control server to send a command to the EP IoT device to reduce the transmit power level, e.g., by 1.5 dB, at the EP IoT device, e.g., in response to a determination that the training data was successfully received by more than one gateway.

Component 1882 further includes a component 1902 configured to operate the control server to send a command to the EP IoT device to inform the EP IoT device that the TPC training is ended and the current TX power level is the power level to be used for non-associated mode data transmissions, e.g., following component 1898 sending a command to the EP IoT device, and a component 1904 configured to operate the control server to send a command to the EP IoT device to inform the EP IoT device that the TPC training is ended and the current power level is the power level to be used for non-associated mode data transmissions, e.g., in response to a determination the training data was successfully received by the a single gateway but was not successfully received by an additional gateways.

Assembly of components 1800 further includes a component 1906 configured to operate the control server to receive forwarded EP IoT device application data, e.g. while in the non-associated mode.

Various aspects and/or features of some embodiments of the present invention are further described below.

In some embodiments in association mode, an End Point—Gateway (EP—GW) association, e.g., a virtual association, is imposed on top of a Medium Access Control Layer (MAC) layer, e.g., a Long Range Low Power Wide Area Network (LPWAN) (LoRaWAN) MAC layer or other protocol MAC layer.

In some embodiments, in non-association mode, higher throughputs across the network are achieved and an end point (EP) device is able to use the largest available payload size to minimize end to end (E2E) delays and fragmentation.

In some embodiments, transmit power control loops are implemented, e.g. at the physical (PHY) and MAC layer, that guarantee that a device, e.g., and EP device communicates with a single GW. In some embodiments, transmit power control loops are implemented, e.g. at the physical (PHY) and MAC layer, that increase the likelihood, e.g., significantly increase the likelihood, that a device, e.g., and EP device communicates with a single GW.

In some embodiments, a control server, e.g. an application server (AS) or a network server (NS), or an EP device, requests a single route from the EP to the NS/AS through a unique GW. In some embodiments, multiple modes of EP operation are supported, e.g., an associated mode and a non-associated mode. In some embodiments, a fall-safe mode is incorporated in the implementation to exit the GW associated mode and fall back to the original architecture, e.g., a LoRaWAN architecture or other protocol architecture. In some embodiments, both the associated mode and the non-associated mode support transmission power control (TPC) of the EP device under the control of a control server, e.g., an application server.

In some embodiments, implementation includes a building block for Internet Protocol (IP) connectivity on top of another protocol, e.g., a LoRaWAN protocol or another protocol.

Various exemplary Transmit Power Control (TPC) loops, implemented in accordance with some embodiments the present invention, provide a unique way to guarantee or significantly increase the likelihood of a single route communication from the NS/AS to the device/EP. This approach of using TPC to achieve or increase the likelihood of a single route is advantageous in that it can result in one or more or all of: i) increase the ability to achieve higher data rates, e.g. up to 22 kpbs as opposed to the 1.1-5 kbps in the normal way of operation in LoRaWAN, ii) provide for low cost device localization by cell association; iii) minimize interference of different sensors to each other and ensure longer battery life for devices (EP devices); and iv) guarantee or provide for device backward compatibility, e.g. full device backward compatibility, to an existing protocol, e.g., LoRaWAN or another protocol being used.

In some embodiments, in associated mode, the exemplary embodiment, in accordance with the present invention, allows devices, e.g. EP devices such as IoT EP devices, to be associated, e.g. virtually associated, to gateways (GWs) in the network, e.g., LoRaWAN or other network. This approach allows for easier, non-intrusive device localization, easier device management and easier Operations and Management (O&M) and/or easier Operations and Maintenance (O&M) operations such as, e.g. firmware updates for devices within the same cell.

In various embodiments, the associated mode introduces new procedures, e.g. new LoRaWAN procedures, that can be implemented either at the application of the MAC layer.

In some embodiments, in non-associated mode, the exemplary embodiment allows an increase in the payload sizes for devices, e.g. EP devices such as EP IoT devices, and makes use of the highest available data rates. In some embodiments, non-associated mode facilitates similar functionalities as described above with respect to associated mode while guaranteeing or providing for backward compatibility, e.g. full backward compatibility, on the device.

In some embodiments, the transmit power control (TPC) method, in accordance with the present invention, makes it possible to ensure that every EP device, e.g. sensor device, is served by only 1 GW to ensure a single path from NS/AS to the EP (thru a single GW). In some embodiments, the transmit power control (TPC) method, in accordance with the present invention, increases the likelihood that an EP device, e.g. a sensor device, is served by only 1 GW with a single path from NS/AS to the EP (thru a single GW).

In various embodiments, novel architecture and/or methods in accordance with an exemplary embodiment includes one or more or all of the following features. Devices can be and sometimes are paired, e.g., virtually paired, to a single GW. An exemplary TPC method facilitates locking a device to a single GW. In some embodiments, the TPC algorithm acts only on the application (APP) layer, thus not breaking the lower protocol, e.g., LoRaWAN protocol or other implemented protocol dependencies. In some embodiments, a virtualized edge-node is able to generate and maintain E2E unique routes. In some embodiments, a virtualized edge-node includes GW HW and encompasses NS functionalities.

Application level implication of some embodiments will now be described. In some embodiments, a base protocol, e.g. a LPWAN/LoRaWAN protocol or another protocol, is augmented with custom application-layer commands built on the standard MAC layer, e.g., LoRaWAN MAC layer or other protocol MAC layer, to request and initiate an IP connectivity on top of the connection, e.g., LPWAN or LoRaWAN or other protocol connection.

Exemplary added MAC commands include:
i) AssociationReq: a command issued by the EP to initiate a unique E2E route between the device and NS/AS;
ii) AssociationACK: a command issued by the NS to acknowledge the request and send back a request to put the EP in Class C always On device;
iii) RouteReq: a command that ACKs the Class C capability of the EP and is transmitted at the highest DataRate highest TX power and EP switches to Class C.
iv) RouteAck: a command issued by the NS to the EP
v) TrainingRoute: N ACK-ed frames are generated by the EP and are all ACK-ed by the NS; those frames will be used to generate and guarantee a single route between EP and NS thru a single GW.
vi) AssociationExitReq: a command generated by either NS or EP to request suspending the associated link; and vii) AssociationExitACK: EP or NS acknowledging fall back mode to non-associated connectivity, e.g. LoRaWAN/LPWAN non-associated connectivity or another protocol non-associated connectivity.

Various MAC-Level implications will now be described. Various implementation of the current invention, includes the unique feature that it is built on a standard existing MAC protocols, e.g., a standard LPWAN existing MAC protocol. It can be firmware update over the air (FUOTA) on top of LoRaWAN, SIGFox, NB-IoT, LTE CAt-M, etc. Previously discussed application request and ACKs can be expressed as a function of existing MAC commands, e.g., existing LoRaWAN MAC commands or existing another protocol MAC commands, e.g. ADR Req, MAC ACK, LinkCheck, etc.

In some embodiments, according to the existing protocol, e.g. LPWAN/LoRaWAN, each of the JoinReq and DATA transmission will stay compliant with the standard. In some embodiments, starting at AssociationReq, those commands are custom commands to enable EP-GW-NS unique EE2E connection. In some embodiments, as per the existing protocol, e.g. LoRaWAN protocol or other existing protocol, each of the frames are broadcast and there is no GW association. Various features of the current invention help maintain a single route between each given EP and GW. This will help implement 6lowpan and other compression mechanisms on top of the existing protocol, e.g., on top of LPWAN/LoRaWAN or on top of another implemented protocol. In some embodiments, TrainingRoute are a set of MAC frames that used adaptable bit rates (ADR) to set an EP with regard to TX to ensure that each EP is received by at most a single GW.

Various aspects and/or features related to TrainingRoute will now be described. In some embodiments, TrainingRoute frames are special AD RACK-ed frames where the EP starts transmitting at its maxpower and max DataRate, e.g., 22 kbps (SF7BW500). Transmitting at the max rate, ensures that as the EP and NS iterate on the TX powers, it is always guaranteed that the link budget is decreasing by fixing one of the variable (i.e. DataRate (DR)). Fixing DR at the highest DR will ensure that a connection at 22 kbps, which is suitable for most sensor applications and delay tolerant applications. In each TrainingRoute frame, the EP and AS exchange thru one or more GWs, and the goal is to have the EP transmit at a low enough TX power to be received and ACK-ed by a single GW. This is ensured by using standard ADR commands, e.g., LoRaWAN standard ADR commands or another protocol standard ADR commands, and decreasing at each iteration TX power by 1.5 dB or another predetermined value, from both EP and GW (uplink frames will tune the EP TX power and DL frames will tune the GW TX power.)

Information regarding exemplary messages, in accordance with some embodiments, will now be described. The application server (AS) appends Meta data to messages. Exemplary Meta data appended by AS includes, e.g., app_id, device_id, hardware serial, port, counter, and is retry.

The EP device sends, e.g., Base 64 encoded payload.

Exemplary Meta data appended by NS includes, e.g. "airtime"—airtime in milliseconds, "time"—time when the server received the message, "frequency"—frequency at which the message was sent, "modulation"—modulation that was used, e.g. LORA or FSK, "data rate"—Data Rate that was used—if LORA modulation, "bit rate"—Bit rate that was used if FSK modulation, "coding_rate"—Coding rate that was used.

Exemplary Meta data information appended by the GWs includes, e.g. "gtw-id"—EUI of the gateway, "timestamp"—timestamp when the gateway received the message, "time"—time when the gateway received the message, "channel"—channel where the gateway received the message, "rssi"—signal strength of the received message, "snr"—signal to noise ratio of the received message, "rf_chain"—RF chain where the gateway received the message, "latitude"—latitude of the gateway reported in its status updates, "longitude"—longitude of the gateway, "device_latitude"—latitude of the EP device, "device—longitude"—longitude of the EP device.

In some embodiments every time the EP sends data (payload or MAC commands), the EP actually sends encrypted bytes over a modulation, e.g. a LoRa modulation following the LoRaWAN standard, or another alternative modulation following an alternative corresponding standard.

Gateway(s) receive the data and convert the payload, e.g., into base64 data, and append some RF characteristics, timestamp, their location, etc. Gateway(s) send this converted payload and appended meta data to a network server, e.g. via a backhaul including the Internet.

The network server (NS) receives this data, e.g. from one or more gateways and aggregates the traffic per device, e.g. per EP device. The NS sends the aggregated data to the AS.

The AS receives the data per device and takes decisions on the application data.

In some embodiments of the present invention, standard messages are used, but a unique differentiator is that in accordance with a feature of some embodiments of the present invention, an association is created on top of an existing protocol, e.g., LoRaWAN protocol or other protocol. This novel mechanism is not included in the existing standard. Some embodiments, in accordance with the present invention, include a unique E2E route association. An association request message is sent by an EP device, and is received by two or more GWs, but it is intended that an association be established with only one GW. The GWs which successfully received the association request message forward the recovered message with GW meta data including RF information, e.g., GW ID info, received signal strength info (RSSI) and SNR information to the network server. The NS receives the information from the GWs which successfully received the association request, e.g., aggregating received information. In some embodiments, the NS decides to use one GW, e.g., GW2 based on RF characteristics and informs the AS of the decision. In other embodiments, the NS sends the aggregated information to the AS which makes the decision as to which GW to use, e.g. selecting GW2 based on better RF characteristics. An association ACK is generated and sent back to the EP. Subsequently, TPC of the EP under the direction of the application server is performed. A training route data frame is broadcast by the EP, e.g., starting with maximum TX power level at maximum data rate. If the training route frame is received my multiple GWs, then the AS controls the EP to reduce TX power, e.g., by 1.5 dB, and send another frame. Eventually, e.g., after N frames, the transmitted frame is only received by a single GW, which is the associated GW, and the training is terminated.

In some embodiments, in non-associated mode, for non-associated mode, TPC training is still performed, in a similar manner to associated mode, but there is no formal association between the EP and a particular GW. The TPC reductions are performed in iterations until the EP is just left communicating with one GW.

Note that during non-associated mode the target gateway is the gateway which can receive data from the end point device at the maximum data rate using the lowest transmit power. In some embodiments, the determination of the target gateway and determination of the lowest transmit power level is made via a power control training phase in which end point transmission power is successively reduced, e.g., until successful communications with only one gateway remain. The determined target gateway will normally be the gateway with the best wireless communications path to the end point device and will in most, if not all cases, be the gateway closest to the end point device.

In embodiments where an end point device can operate what is referred to as associated mode, the end point device or control server, e.g., application server, may specify a particular target gateway to be used. The gateway could be specified because it is operated by the same service provider and/or for other reasons such as having a good backhaul connection to the control server (e.g., application server) and/or having a good wireless connection to the end point device. In associated mode a power control training phase is used to determine an end point device transmission power level, e.g., a minimum level or near minimum level, in which data is received by the target gateway at the maximum supported transmission data rate.

Numbered List of Exemplary Method Embodiments

Method Embodiment 1 A communications method, the method comprising: receiving at a control server, training data (1242 or 1288) that was wirelessly transmitted by a first end point device (e.g., EP device 220) and received by one or more gateways (e.g., GW1 202 and/or GW2 (204)) coupled to said control server (218); determining ((1250) or (1294)) whether the training data was successfully received by at least one gateway in addition to a target gateway (e.g., where the target gateway is either a selected gateway when in association mode or a gateway which can be reached by the lowest power transmission that can support the maximum transmission data rate, if the target gateway is the individual gateway which can support the maximum transmission data rate at the lowest power level if more than one gateway successful receives the training data at the maximum data rate than the training data was successfully received by an additional gateway if the identity of the target gateway is unknown since it has not yet been identified via power down operations); when it is determined that ((1250) or (1294)) the training data was successfully received by at least one gateway in addition to the target gateway, sending ((1254) or (1300)) a command to the first end point device to reduce the transmit power level (e.g., by a predetermined amount such as 1.5 dB or some other amount, e.g., 2 dB); and when it is determined that ((1250) or (1294)) the training data was not successfully received by at least one gateway in addition to the target gateway, sending ((1258) or (1304)) a command to the first end point device to indicate that training (e.g., transmit power control (TPC) training) has ended.

Method Embodiment 2 The method of Method Embodiment 1, further comprising, prior to determining ((1250) or (1294)) whether the training data was successfully received by at least one gateway in addition to a target gateway performing the step of: operating the control server (218) to send ((1238) or (1284)) a command to the first end point device (e.g., EP device 220) to transmit training data at a maximum transmission power level.

Method Embodiment 3 The method of Method Embodiment 2, wherein the command to the first end point also commands the end point to use a maximum transmission data rate.

Method Embodiment 4 The method of Method Embodiment 2, further comprising prior to determining ((1250) or (1294)) whether the training data was successfully received by at least one gateway in addition to a target gateway performing the step of: determining (1244) that the training data was successfully received by the selected gateway.

Method Embodiment 5 The method of Method Embodiment 1, wherein the target gateway is a single individual gateway in the communications system capable of receiving data at the maximum transmission data rate using a lowest transmission power level that can successfully support the maximum transmission data rate given a current location of the first end point device.

Method Embodiment 6 The method of Method Embodiment 1, wherein a plurality of gateways are able to receive data transmitted by the first end point device at the maximum transmission rate and highest transmission power level, and wherein the target gateway is the single gateway from among the plurality of gateways which is able to receive data transmitted by the first end point device at the maximum transmission rate and a determined reduced transmission power level to be used for subsequent application data transmissions.

Method Embodiment 7 The method of Method Embodiment 6, wherein said subsequent application data transmissions are sensor measurement reports.

Method Embodiment 8 The method of Method Embodiment 6, wherein the target gateway is the single remaining gateway following one or more iterations of transmission power control training which eliminated the other gateways in the plurality of gateways.

Method Embodiment 9 The method of Method Embodiment 1, wherein the target gateway is a gateway specified by the first end point device or the control server (application server) when the first end point device is to operate in an associated mode of operation.

Method Embodiment 10 The method of Method Embodiment 1, further comprising: selecting (1212) at the control server, a gateway to be used for communications from the first end point device to the control server, said selected gateway being the target gateway.

Method Embodiment 11 The method of Method Embodiment 10, further comprising: receiving (1204, 1206, or 1208) at the control server, prior to selecting (1212) the gateway to be used for communications from the first end point device to the control server (218), an association request from the first end point device.

Method Embodiment 12 The method of Method Embodiment 11, wherein said association request (see step 1206) indicates a requested gateway to be used for communications with said control server.

Method Embodiment 13 The method of Method Embodiment 1, wherein the method includes determining ((1250) or (1294)) that the training data was successfully received by at least one gateway in addition to a target gateway and sending ((1254) or (1300)) a command to the first end point device to reduce the transmit power level, the method further comprising: receiving at a control server, training data (second iteration of step 1242 or step 1288) that was wirelessly transmitted at a reduced power level by the first end point device and received by one or more gateways (e.g., GW1 102 and/or GW2 (204)) coupled to said control server (218); determining (second iteration of step 1244 or 1290 through the loop) whether the training data transmitted by the first end point device at the reduced power level was successfully received by the target gateway.

Method Embodiment 14 The method of Method Embodiment 13, further comprising: in response to determining that the training data transmitted by the first end point at the reduced power level was not successfully received by the target gateway (e.g., a no decision in step 1244 or 1290 during second iteration of loop), sending ((1552) or 1298)) a command to the first end point device to increase the transmit power level.

Method Embodiment 15 The method of Method Embodiment 14, wherein said command to the end point device to increase the transmit power level also indicates that the end point device is to exit a power control training phase of operation or the method further includes the control server sending an exit power control training phase of operation command to the end point device.

Method Embodiment 16 The method of Method Embodiment 13, further comprising: in response to determining that the training data transmitted by the first end point at the reduced power level was successfully received by the target gateway, determining (step (1250) or (1294) performed e.g., during a second iteration of the loop) whether the training data transmitted at the reduced power level was successfully received by at least one gateway in addition to the target gateway.

Method Embodiment 17 The method of Method Embodiment 16, further comprising: in response to determining that the training data transmitted at the reduced power level was successfully received by at least one gateway in addition to the target gateway, sending (1254 or 1300) a command to the end point device to reduce the transmit power level.

Method Embodiment 18 The method of Method Embodiment 16, further comprising, in response to determining that the training data transmitted at the reduced power level was not successfully received by at least one gateway in addition to the target gateway, sending (1258 or 1304) a command to the end point device indicating that the current transmission power level is to be used for data transmissions.

Method Embodiment 19 The method of Method Embodiment 18, wherein said command to the end point device indicating that the current transmission power level is to be used for data transmissions further indicates that transmission power control training mode of operation has ended.

Method Embodiment 20 The method of Method Embodiment 1, wherein the first end point device is an Internet-of-Things (IoT) end point device.

Method Embodiment 21 The method of Method Embodiment 20, wherein said one or more gateways are IoT gateways.

Numbered List of Exemplary Apparatus Embodiments

Apparatus Embodiment 1 A control server (218 or 1400) comprising: a processor (1402) configured to: operate the control server to receive, at the control server, training data (1242 or 1288) that was wirelessly transmitted by a first end point device (e.g., EP device 220) and received by one or more gateways (e.g., GW1 202 and/or GW2 (204)) coupled to said control server (218); determine ((1250) or (1294)) whether the training data was successfully received by at least one gateway in addition to a target gateway (e.g., where the target gateway is either a selected gateway when in association mode or a gateway which can be reached by the lowest power transmission that can support the maximum transmission data rate, if the target gateway is the individual gateway which can support the maximum transmission data rate at the lowest power level if more than one gateway successful receives the training data at the maximum data rate than the training data was successfully received by an additional gateway if the identity of the target gateway is unknown since it has not yet been identified via power down operations); when it is determined that ((1250) or (1294)) the training data was successfully received by at least one gateway in addition to the target gateway, operate the control server to send ((1254) or (1300)) a command to the first end point device to reduce the transmit power level (e.g., by a predetermined amount such as 1.5 dB or some other amount, e.g., 2 dB); and when it is determined that ((1250) or (1294)) the training data was not successfully received by at least one gateway in addition to the target gateway, operate the control server to send ((1258) or (1304)) a command to the first end point device to indicate that training (e.g., transmit power control (TPC) training) has ended.

Apparatus Embodiment 2 The control server of Apparatus Embodiment 1, wherein said processor is further configured to: operate the control server (218) to send ((1238) or (1284)) a command to the first end point device (e.g., EP device 220) to transmit training data at a maximum transmission power level, prior to determining ((1250) or (1294)) whether the training data was successfully received by at least one gateway in addition to a target gateway.

Apparatus Embodiment 3 The control server of Apparatus Embodiment 2 wherein the command to the first end point also commands the end point to use a maximum transmission data rate.

Apparatus Embodiment 4 The control server of Apparatus Embodiment 2, wherein said processor determines (1244) that the training data was successfully received by the selected gateway, prior to determining ((1250) or (1294)) whether the training data was successfully received by at least one gateway in addition to a target gateway.

Apparatus Embodiment 5 The control server of Apparatus Embodiment 1, wherein the target gateway is a single individual gateway in the communications system capable of receiving data at the maximum transmission data rate using a lowest transmission power level that can successfully support the maximum transmission data rate given a current location of the first end point device.

Apparatus Embodiment 6 The control server of Apparatus Embodiment 1, wherein a plurality of gateways are able to receive data transmitted by the first end point device at the maximum transmission rate and highest transmission power level, and wherein the target gateway is the single gateway from among the plurality of gateways which is able to receive data transmitted by the first end point device at the maximum transmission rate and a determined reduced transmission power level to be used for subsequent application data transmissions.

Apparatus Embodiment 7 The control server of Apparatus Embodiment 6, wherein said subsequent application data transmissions are sensor measurement reports.

Apparatus Embodiment 8 The control server of Apparatus Embodiment 6, wherein the target gateway is the single remaining gateway following one or more iterations of transmission power control training which eliminated the other gateways in the plurality of gateways.

Apparatus Embodiment 9 The control server of Apparatus Embodiment 1, wherein the target gateway is a gateway specified by the first end point device or the control server (application server) when the first end point device is to operate in an associated mode of operation.

Apparatus Embodiment 10 The control server of Apparatus Embodiment 1, wherein said processor is further configured to: select (1212) at the control server, a gateway to be used for communications from the first end point device to the control server, said selected gateway being the target gateway.

Apparatus Embodiment 11 The control server of Apparatus Embodiment 10, wherein said processor is further configured to: operate the control server to receive (1204, 1206, or 1208) at the control server, prior to selecting (1212) the gateway to be used for communications from the first end point device to the control server (218), an association request from the first end point device.

Apparatus Embodiment 12 The control server of Apparatus Embodiment 11, wherein said association request (see step 1206) indicates a requested gateway to be used for communications with said control server.

Apparatus Embodiment 13 The control server of Apparatus Embodiment 1, wherein the processor determines ((1250) or (1294)) that the training data was successfully received by at least one gateway in addition to a target gateway and operates the control server sending ((1254) or (1300)) a command to the first end point device to reduce the transmit power level, and wherein said processor is further configured to: operate the control server to receive at a control server, training data (second iteration of step 1242 or step 1288) that was wirelessly transmitted at a reduced power level by the first end point device and received by one or more gateways (e.g., GW1 102 and/or GW2 (204)) coupled to said control server (218); and determine (second iteration of step 1244 or 1290 through the loop) whether the training data transmitted by the first end point device at the reduced power level was successfully received by the target gateway.

Apparatus Embodiment 14 The control server of Apparatus Embodiment 13, wherein said processor is further configured to: in response to determining that the training data transmitted by the first end point at the reduced power level was not successfully received by the target gateway (e.g., a no decision in step 1244 or 1290 during second iteration of loop), operate the control server to send ((1552) or 1298)) a command to the first end point device to increase the transmit power level.

Apparatus Embodiment 15 The control server of Apparatus Embodiment 14, wherein said command to the end point device to increase the transmit power level also indicates that the end point device is to exit a power control training phase of operation or the method further includes the control server sending an exit power control training phase of operation command to the end point device.

Apparatus Embodiment 16 The control server of Apparatus Embodiment 13, wherein said processor is further configured to: in response to determining that the training data transmitted by the first end point at the reduced power level was successfully received by the target gateway, determine (step (1250) or (1294) performed, e.g., during a second iteration of the loop) whether the training data transmitted at the reduced power level was successfully received by at least one gateway in addition to the target gateway.

Apparatus Embodiment 17 The control server of Apparatus Embodiment 16, wherein said processor is further configured to: in response to determining that the training data transmitted at the reduced power level was successfully received by at least one gateway in addition to the target gateway, operate the control server to send (1254 or 1300) a command to the end point device to reduce the transmit power level.

Apparatus Embodiment 18 The control server of Apparatus Embodiment 16, wherein said processor is further configured to, in response to determining that the training data transmitted at the reduced power level was not successfully received by at least one gateway in addition to the target gateway, operate the control server to send (1258 or 1304) a command to the end point device indicating that the current transmission power level is to be used for data transmissions.

Apparatus Embodiment 19 The control server of Apparatus Embodiment 18, wherein said command to the end point device indicating that the current transmission power level is to be used for data transmissions further indicates that transmission power control training mode of operation has ended.

Apparatus Embodiment 20 The control server of Apparatus Embodiment 1, wherein the first end point device is an Internet-of-Things (IoT) end point device.

Apparatus Embodiment 21 The control server of Apparatus Embodiment 20, wherein said one or more gateways are IoT gateways.

Numbered List of Exemplary Non-Transitory Computer Readable Medium Embodiments:

Non-Transitory Computer Readable Medium Embodiment 1 A non-transitory computer readable medium (1410) including computer executable instructions which when executed by a processor (1402) of a control server (1400) cause the control server (1400) to perform the steps of: receiving at a control server, training data (1242 or 1288) that was wirelessly transmitted by a first end point device (e.g., EP device 220) and received by one or more gateways (e.g., GW1 202 and/or GW2 (204)) coupled to said control server (218); determining ((1250) or (1294)) whether the training data was successfully received by at least one gateway in addition to a target gateway (e.g., where the target gateway is either a selected gateway when in association mode or a gateway which can be reached by the lowest power transmission that can support the maximum transmission data rate, if the target gateway is the individual gateway which can support the maximum transmission data rate at the lowest power level if more than one gateway successful receives the training data at the maximum data rate than the training data was successfully received by an additional gateway if the identity of the target gateway is unknown since it has not yet been identified via power down operations); when it is determined that ((1250) or (1294)) the training data was successfully received by at least one gateway in addition to the target gateway, sending ((1254) or (1300)) a command to the first end point device to reduce the transmit power level (e.g., by a predetermined amount such as 1.5 dB or some other amount, e.g., 2 dB); and when it is determined that ((1250) or (1294)) the training data was not successfully received by at least one gateway in addition to the target gateway, sending ((1258) or (1304)) a command to the first end point device to indicate that training (e.g., transmit power control (TPC) training) has ended.

Various embodiments are directed to apparatus, e.g., control servers such as application servers (ASs), network server, gateways such as IoT gateways, End Point (EP) devices such as EP IoT devices, e.g. EP IoT sensor or application devices, user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, an AMF device, servers, customer premises equipment devices, cable systems, non-cellular networks, cellular networks, service management systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating control servers such as application servers (ASs), network server, gateways such as IoT gateways, End Point (EP) devices such as EP IoT devices, e.g. EP IoT sensor or application devices user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, user devices, base stations, gateways, servers, cable networks, cloud networks, nodes, servers, cloud service servers, customer premises equipment devices, controllers, network monitoring nodes/servers and/or cable or network equipment devices. Various embodiments are also directed to methods, e.g., method of controlling and/or operating a communications system including EP devices, e.g. IoT EP devices, gateways, a network server, and a control server, e.g. an application server. Various embodiments are also directed to methods, e.g., method of operating a control server to associate and EP device with a particular gateway, establish an E2E communications path between an EP device and the control server, control TX power levels at EP devices and gateways, and manage loading and interference. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

Non-associated mode can be, and in various embodiments is, implemented without the need for end user devices to include any additional functionality, e.g., hardware functionality, or capabilities beyond that normally included in standard EP devices. This is because in non-associated mode, control, e.g., intelligence used to implemented the mode, is placed and implemented in the network server (NS or controller) thus allowing EP devices to obtain the benefits made possible by non-associated mode without requiring changes to EP devices.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g. a control server such as application server (AS), a network server, a gateway such as an IoT gateway, an End Point (EP) device such as EP IoT device, e.g. EP IoT sensor or application device, a user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., said device including a processor configured to implement one, multiple or all of the steps of one or more methods of the invention.

In some embodiments, the processor or processors, e.g., CPUs, of one or more devices, e.g., a control server such as application server (AS), network server, gateway such as IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a control server such as application server (AS), network server, gateway such as an IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a component corresponding to each of one or more of the steps of the various described methods performed by the device in which the processor is included. In some but not all embodiments a device, e.g., a control server such as application server (AS), network server, gateway such as IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as control server such as an application server (AS), network server, gateway such as IoT gateway, End Point (EP) device such as EP IoT device, e.g. EP IoT sensor or application device 3, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
receiving at a control server, training data that was wirelessly transmitted by a first end point device and received by one or more gateways coupled to said control server;
determining whether the training data was successfully received by at least one gateway in addition to a target gateway;
when it is determined that the training data was successfully received by at least one gateway in addition to the target gateway, sending a command to the first end point device to reduce the transmit power level; and
when it is determined that the training data was not successfully received by at least one gateway in addition to the target gateway, sending a command to the first end point device to indicate that training has ended.

2. The method of claim 1, further comprising, prior to determining whether the training data was successfully received by at least one gateway in addition to the target gateway performing the step of:
operating the control server to send a command to the first end point device to transmit training data at a maximum transmission power level.

3. The method of claim 2, wherein the command to the first end point device also commands the first end point device to use a maximum transmission data rate.

4. The method of claim 1, wherein the target gateway is a single individual gateway in a communications system capable of receiving data at a maximum transmission data rate using a lowest transmission power level that can successfully support the maximum transmission data rate given a current location of the first end point device.

5. The method of claim 1, wherein the target gateway is a gateway specified by the first end point device or the control server when the first end point device is to operate in an associated mode of operation.

6. The method of claim 1, wherein the method includes determining that the training data was successfully received by at least one gateway in addition to the target gateway and sending the command to the first end point device to reduce the transmit power level, the method further comprising:
receiving at the control server, training data that was wirelessly transmitted at a reduced power level by the first end point device and received by one or more gateways coupled to said control server; and
determining whether the training data transmitted by the first end point device at the reduced power level was successfully received by the target gateway.

7. The method of claim 6, further comprising:
in response to determining that the training data transmitted by the first end point device at the reduced power level was not successfully received by the target gateway, sending a command to the first end point device to increase the transmit power level.

8. The method of claim 6, further comprising:
in response to determining that the training data transmitted by the first end point device at the reduced power level was successfully received by the target gateway, determining whether the training data transmitted at the reduced power level was successfully received by at least one gateway in addition to the target gateway.

9. The method of claim 6, further comprising:
in response to determining that the training data transmitted at the reduced power level was successfully received by at least one gateway in addition to the target gateway,
sending a command to the first end point device to reduce the transmit power level.

10. The method of claim 6, further comprising, in response to determining that the training data transmitted at the reduced power level was not successfully received by at least one gateway in addition to the target gateway, sending a command to the first end point device indicating that the current transmission power level is to be used for data transmissions.

11. The method of claim 10, wherein said command to the first end point device indicating that the current transmission power level is to be used for data transmissions further indicates that transmission power control training mode of operation has ended.

12. The method of claim 1, wherein the first end point device is an Internet-of-Things (IoT) end point device and wherein said one or more gateways are IoT gateways.

13. A control server comprising:
a processor configured to:
operate the control server to receive, at the control server, training data that was wirelessly transmitted by a first end point device and received by one or more gateways coupled to said control server;
determine whether the training data was successfully received by at least one gateway in addition to a target gateway;
when it is determined that the training data was successfully received by at least one gateway in addition to the target gateway, operate the control server to send a command to the first end point device to reduce the transmit power level; and
when it is determined that the training data was not successfully received by at least one gateway in addition to the target gateway, operate the control server to send a command to the first end point device to indicate that training has ended.

14. The control server of claim 13, wherein the processor determines that the training data was successfully received by at least one gateway in addition to the target gateway and operates the control server to send the command to the first end point device to reduce the transmit power level, and wherein said processor is further configured to:
operate the control server to receive at the control server, training data that was wirelessly transmitted at a reduced power level by the first end point device and received by one or more gateways coupled to said control server; and
determine whether the training data transmitted by the first end point device at the reduced power level was successfully received by the target gateway.

15. The control server of claim 14, wherein said processor is further configured to:
in response to determining that the training data transmitted by the first end point device at the reduced power level was not successfully received by the target gateway, operate the control server to send a command to the first end point device to increase the transmit power level.

16. The control server of claim 14, wherein said processor is further configured to:
in response to determining that the training data transmitted by the first end point device at the reduced power level was successfully received by the target gateway, determine whether the training data transmitted at the reduced power level was successfully received by at least one gateway in addition to the target gateway.

17. The control server of claim 16, wherein said processor is further configured to:
in response to determining that the training data transmitted at the reduced power level was successfully received by at least one gateway in addition to the target gateway,
operate the control server to send a command to the first end point device to reduce the transmit power level.

18. The control server of claim 16, wherein said processor is further configured to, in response to determining that the training data transmitted at the reduced power level was not successfully received by at least one gateway in addition to the target gateway, operate the control server to send a command to the first end point device indicating that the current transmission power level is to be used for data transmissions.

19. The control server of claim 18, wherein said command to the first end point device indicating that the current transmission power level is to be used for data transmissions further indicates that transmission power control training mode of operation has ended.

20. A non-transitory computer readable medium including computer executable instructions which when executed by a processor of a control server cause the control server to perform the steps of:
receiving at a control server, training data that was wirelessly transmitted by a first end point device and received by one or more gateways coupled to said control server;
determining whether the training data was successfully received by at least one gateway in addition to a target gateway;
when it is determined that the training data was successfully received by at least one gateway in addition to the target gateway, sending a command to the first end point device to reduce the transmit power level; and
when it is determined that the training data was not successfully received by at least one gateway in addition to the target gateway, sending a command to the first end point device to indicate that training has ended.

* * * * *